(12) United States Patent
Swift et al.

(10) Patent No.: US 11,872,181 B2
(45) Date of Patent: *Jan. 16, 2024

(54) SEMI-SUPERVISED INTENT RECOGNITION SYSTEM AND METHOD

(71) Applicant: Roam Robotics Inc., San Francisco, CA (US)

(72) Inventors: Tim Swift, Walnut Creek, CA (US); Kevin Kemper, San Francisco, CA (US)

(73) Assignee: ROAM ROBOTICS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,934

(22) Filed: Apr. 26, 2022

(65) Prior Publication Data

US 2022/0249311 A1 Aug. 11, 2022

Related U.S. Application Data

(63) Continuation of application No. 16/116,246, filed on Aug. 29, 2018, now Pat. No. 11,351,083.

(Continued)

(51) Int. Cl.
*A61H 3/00* (2006.01)
*A61H 1/00* (2006.01)
*A61H 1/02* (2006.01)

(52) U.S. Cl.
CPC ............... *A61H 3/00* (2013.01); *A61H 1/00* (2013.01); *A61H 1/024* (2013.01); *A61H 1/0262* (2013.01);

(Continued)

(58) Field of Classification Search
CPC . A61H 3/00; A61H 1/00; A61H 1/024; A61H 1/0262; A61H 2003/001;

(Continued)

(56) References Cited

U.S. PATENT DOCUMENTS 3,823,711 A   7/1974  Hatton
3,868,952 A   3/1975  Hatton (Continued)

FOREIGN PATENT DOCUMENTS

CN   101151071 A   3/2008
CN   103412003 A   11/2013

(Continued)

OTHER PUBLICATIONS

English translation for JP 20000051289, machine translated my Search Clarivate Analytics, translated on Feb. 17, 2023.*

(Continued)

*Primary Examiner* — Tu A Vo
(74) *Attorney, Agent, or Firm* — Davis Wright Tremaine LLP

(57) ABSTRACT

A robotic system configured to, in response to a state transition intention input, change the robotic system from operating in a first mode with sensitivity to detecting state transitions at a first sensitivity level to operating temporarily in a second mode with sensitivity to detecting state transitions at a second sensitivity level that is more sensitive than the first sensitivity level. The state transition intention input indicates an intention to make a state transition from a first state to a second state, with the second state being possible from a plurality of possible different states.

15 Claims, 15 Drawing Sheets

Related U.S. Application Data

(60) Provisional application No. 62/551,696, filed on Aug. 29, 2017.

(52) U.S. Cl.
CPC .. *A61H 2003/001* (2013.01); *A61H 2003/007* (2013.01); *A61H 2201/1238* (2013.01); *A61H 2201/1409* (2013.01); *A61H 2201/165* (2013.01); *A61H 2201/1642* (2013.01); *A61H 2201/1652* (2013.01); *A61H 2201/1676* (2013.01); *A61H 2201/5007* (2013.01); *A61H 2201/5023* (2013.01); *A61H 2201/5025* (2013.01); *A61H 2201/5058* (2013.01); *A61H 2201/5061* (2013.01); *A61H 2201/5064* (2013.01); *A61H 2201/5069* (2013.01); *A61H 2201/5084* (2013.01); *A61H 2201/5097* (2013.01); *A61H 2203/0406* (2013.01); *A61H 2205/10* (2013.01)

(58) Field of Classification Search
CPC ............ A61H 1/0237; A61H 2003/007; A61H 2201/1238; A61H 2201/1409; A61H 2201/1642; A61H 2201/165; A61H 2201/1652; A61H 2201/1676; A61H 2201/5007; A61H 2201/5023; A61H 2201/5025; A61H 2201/5058; A61H 2201/5061; A61H 2201/5064; A61H 2201/5069; A61H 2201/5084; A61H 2201/5097; A61H 2203/0406; A61H 2205/10; B25J 9/0006
See application file for complete search history.

(56) References Cited

U.S. PATENT DOCUMENTS

| | | | |
|---|---|---|---|
| 3,982,531 A | 9/1976 | Shaffer | |
| 3,993,056 A | 11/1976 | Rabischong et al. | |
| 4,274,399 A | 6/1981 | Mummert | |
| 4,523,582 A | 6/1985 | Barber | |
| 4,671,258 A | 6/1987 | Barthlome | |
| 4,944,755 A | 7/1990 | Hennequin et al. | |
| 5,033,457 A | 7/1991 | Bonutti | |
| 5,483,838 A | 1/1996 | Holden | |
| 5,780,123 A | 7/1998 | Kamiyama et al. | |
| 6,117,507 A | 9/2000 | Smith | |
| 6,248,463 B1 | 6/2001 | Dopp et al. | |
| 6,612,340 B1 | 9/2003 | Lause | |
| 6,776,769 B2 | 8/2004 | Smith | |
| 7,086,322 B2 | 8/2006 | Schulz | |
| 7,479,121 B2 | 1/2009 | Branch | |
| 7,628,766 B1 | 12/2009 | Kazerooni et al. | |
| 8,171,570 B2 | 5/2012 | Adarraga | |
| 8,784,350 B2 | 7/2014 | Cohen | |
| 9,205,560 B1 | 12/2015 | Edsinger et al. | |
| 9,709,206 B2 | 7/2017 | Duttenhoefer et al. | |
| 9,821,475 B1 | 11/2017 | Lynn et al. | |
| 9,827,667 B2 | 11/2017 | Griffith et al. | |
| 9,995,321 B2 | 6/2018 | Lynn et al. | |
| 10,012,229 B2 | 7/2018 | Lynn et al. | |
| 10,245,204 B2 | 4/2019 | Sandler et al. | |
| 10,543,110 B2 | 1/2020 | Piercy et al. | |
| 10,562,180 B2 | 2/2020 | Telleria et al. | |
| 10,605,365 B1 | 3/2020 | Griffith et al. | |
| 10,611,020 B2 | 4/2020 | Griffith et al. | |
| 10,619,633 B2 | 4/2020 | Lynn et al. | |
| 10,780,012 B2 | 9/2020 | Lamb et al. | |
| 10,966,895 B2 | 4/2021 | Lamb et al. | |
| 11,033,450 B2 | 6/2021 | Lamb et al. | |
| 11,213,417 B2 | 1/2022 | Piercy et al. | |
| 11,259,979 B2 | 3/2022 | Swift et al. | |
| 11,351,083 B2 | 6/2022 | Swift et al. | |
| 2001/0029343 A1 | 10/2001 | Seto et al. | |
| 2002/0026794 A1 | 3/2002 | Shahinpoor et al. | |
| 2004/0010720 A1 | 1/2004 | Singh et al. | |
| 2004/0140295 A1 | 7/2004 | Herres | |
| 2005/0066810 A1 | 3/2005 | Schulz | |
| 2005/0102863 A1 | 5/2005 | Hannon et al. | |
| 2006/0069336 A1 | 3/2006 | Krebs et al. | |
| 2006/0161220 A1 | 7/2006 | Kobayashi et al. | |
| 2006/0173552 A1* | 8/2006 | Roy | A61F 2/64 623/44 |
| 2006/0207726 A1 | 9/2006 | Driver et al. | |
| 2007/0042710 A1 | 2/2007 | Mahini et al. | |
| 2007/0075543 A1 | 4/2007 | Marx et al. | |
| 2008/0009771 A1 | 1/2008 | Perry et al. | |
| 2008/0161937 A1* | 7/2008 | Sankai | A61B 5/24 623/25 |
| 2008/0195005 A1 | 8/2008 | Horst et al. | |
| 2008/0234608 A1* | 9/2008 | Sankai | B25J 9/0006 601/5 |
| 2008/0287850 A1 | 11/2008 | Adarraga | |
| 2010/0040936 A1 | 2/2010 | Pozin et al. | |
| 2010/0114329 A1 | 5/2010 | Casler et al. | |
| 2010/0204627 A1 | 8/2010 | Kazerooni et al. | |
| 2010/0249675 A1 | 9/2010 | Fujimoto et al. | |
| 2010/0270771 A1 | 10/2010 | Kobayashi et al. | |
| 2010/0280424 A1 | 11/2010 | Kawakami et al. | |
| 2011/0059355 A1 | 3/2011 | Zhang et al. | |
| 2011/0071417 A1 | 3/2011 | Liu et al. | |
| 2011/0099026 A1 | 4/2011 | Oakley et al. | |
| 2011/0105966 A1 | 5/2011 | Kazerooni et al. | |
| 2011/0118635 A1* | 5/2011 | Yamamoto | A61H 1/0262 601/5 |
| 2011/0186208 A1 | 8/2011 | Cartabbia et al. | |
| 2011/0290798 A1 | 12/2011 | Corbett et al. | |
| 2012/0059291 A1 | 3/2012 | Nguyen | |
| 2012/0259429 A1 | 10/2012 | Han et al. | |
| 2012/0259431 A1 | 10/2012 | Han et al. | |
| 2012/0289870 A1 | 11/2012 | Hsiao-Wecksler et al. | |
| 2012/0328824 A1 | 12/2012 | Cartabbia et al. | |
| 2013/0150980 A1 | 6/2013 | Swift et al. | |
| 2013/0158445 A1 | 6/2013 | Kazerooni et al. | |
| 2013/0245512 A1 | 9/2013 | Goffer et al. | |
| 2013/0289452 A1 | 10/2013 | Smith et al. | |
| 2014/0109560 A1 | 4/2014 | Ilievski et al. | |
| 2014/0171838 A1 | 6/2014 | Aleksov et al. | |
| 2014/0207037 A1 | 7/2014 | Horst | |
| 2014/0212243 A1 | 7/2014 | Yagi et al. | |
| 2014/0276264 A1 | 9/2014 | Caires et al. | |
| 2014/0277739 A1 | 9/2014 | Kornbluh et al. | |
| 2014/0318118 A1 | 10/2014 | Mazzeo et al. | |
| 2015/0088043 A1 | 3/2015 | Goldfield et al. | |
| 2015/0126911 A1 | 5/2015 | Abramowicz et al. | |
| 2015/0173993 A1 | 6/2015 | Walsh et al. | |
| 2015/0209214 A1 | 7/2015 | Herr et al. | |
| 2015/0285238 A1 | 10/2015 | Lynn et al. | |
| 2015/0290794 A1 | 10/2015 | Griffith et al. | |
| 2015/0351991 A1 | 12/2015 | Amundson et al. | |
| 2015/0351995 A1 | 12/2015 | Zoss et al. | |
| 2016/0045386 A1 | 2/2016 | Sandler et al. | |
| 2016/0082319 A1 | 3/2016 | Macri et al. | |
| 2016/0107309 A1 | 4/2016 | Walsh et al. | |
| 2016/0158087 A1 | 6/2016 | Huang et al. | |
| 2016/0213548 A1 | 7/2016 | John et al. | |
| 2016/0242986 A1 | 8/2016 | Nagata et al. | |
| 2016/0242987 A1 | 8/2016 | Nagata et al. | |
| 2016/0252110 A1 | 9/2016 | Galloway et al. | |
| 2016/0261224 A1 | 9/2016 | Madrone et al. | |
| 2016/0278948 A1 | 9/2016 | Piercy et al. | |
| 2016/0297504 A1 | 10/2016 | Saindon et al. | |
| 2016/0300156 A1 | 10/2016 | Bowers et al. | |
| 2016/0331557 A1 | 11/2016 | Tong et al. | |
| 2016/0331624 A1* | 11/2016 | Sankai | B25J 9/101 |
| 2016/0346156 A1 | 12/2016 | Walsh et al. | |
| 2017/0018761 A1 | 1/2017 | Ogino | |
| 2017/0049587 A1 | 2/2017 | Herr et al. | |
| 2017/0202725 A1 | 7/2017 | Robertson et al. | |
| 2017/0279126 A1 | 9/2017 | Dreher | |
| 2017/0282360 A1 | 10/2017 | Telleria et al. | |
| 2018/0042803 A1 | 2/2018 | Amundson | |
| 2018/0079071 A1* | 3/2018 | Griffith | A61H 1/0244 |

(56) References Cited

U.S. PATENT DOCUMENTS

| | | | |
|---|---|---|---|
| 2018/0086178 A1 | 3/2018 | Stanek et al. | |
| 2018/0125152 A1 | 5/2018 | Bruel | |
| 2018/0221237 A1* | 8/2018 | Swift | A61H 1/0237 |
| 2018/0235830 A1 | 8/2018 | Rokosz et al. | |
| 2018/0264642 A1* | 9/2018 | Harding | G16H 40/63 |
| 2018/0283414 A1 | 10/2018 | Lynn et al. | |
| 2018/0296424 A1 | 10/2018 | Parra et al. | |
| 2018/0296425 A1 | 10/2018 | Lamb et al. | |
| 2019/0015233 A1 | 1/2019 | Galloway et al. | |
| 2019/0029918 A1 | 1/2019 | Inada et al. | |
| 2019/0060156 A1 | 2/2019 | Swift et al. | |
| 2019/0060157 A1 | 2/2019 | Lamb et al. | |
| 2019/0105215 A1 | 4/2019 | Dalley et al. | |
| 2019/0283235 A1 | 9/2019 | Nam et al. | |
| 2019/0293223 A1 | 9/2019 | Free et al. | |
| 2019/0307583 A1 | 10/2019 | Herr et al. | |
| 2019/0328604 A1 | 10/2019 | Contreras-Vidal et al. | |
| 2019/0383313 A1 | 12/2019 | Fowler et al. | |
| 2020/0069441 A1 | 3/2020 | Larose et al. | |
| 2020/0114588 A1 | 4/2020 | Wang et al. | |
| 2020/0206899 A1 | 7/2020 | Storz et al. | |
| 2020/0223071 A1 | 7/2020 | Mahoney et al. | |
| 2020/0253808 A1* | 8/2020 | Swift | G06F 8/65 |
| 2021/0177686 A1 | 6/2021 | Lamson et al. | |
| 2021/0369539 A1 | 12/2021 | Campbell et al. | |
| 2021/0369540 A1 | 12/2021 | Kemper et al. | |
| 2021/0369541 A1 | 12/2021 | Stuart et al. | |
| 2021/0369542 A1 | 12/2021 | Stuart et al. | |
| 2021/0370493 A1 | 12/2021 | Samia et al. | |
| 2021/0370494 A1 | 12/2021 | Hurley et al. | |
| 2021/0370495 A1 | 12/2021 | Swartz et al. | |
| 2021/0370496 A1 | 12/2021 | Stuart et al. | |

FOREIGN PATENT DOCUMENTS

| | | | |
|---|---|---|---|
| CN | 104582668 A | 4/2015 | |
| CN | 105205436 A | 12/2015 | |
| CN | 204814712 U | 12/2015 | |
| CN | 105264255 A | 1/2016 | |
| CN | 105590409 A | 5/2016 | |
| CN | 105816301 A | 8/2016 | |
| CN | 105992554 A | 10/2016 | |
| CN | 106029039 A | 10/2016 | |
| CN | 106137489 A | 11/2016 | |
| CN | 106413998 A | 2/2017 | |
| CN | 106420279 A | 2/2017 | |
| CN | 111135031 A | 5/2020 | |
| CN | 111278398 A | 6/2020 | |
| CN | 111571568 A | 8/2020 | |
| DE | 102011107580 A1 | 1/2013 | |
| EP | 2827809 A1 | 1/2015 | |
| EP | 3173191 A2 | 5/2017 | |
| EP | 3576707 A4 | 3/2021 | |
| FR | 1463850 A | 7/1966 | |
| JP | S62501723 A | 7/1987 | |
| JP | S63199965 A | 8/1988 | |
| JP | 2000051289 A | 2/2000 | |
| JP | 2000051289 A * | 2/2000 | |
| JP | 2006000347 A | 1/2006 | |
| JP | 2007282991 A | 11/2007 | |
| JP | 2007282991 A * | 11/2007 | |
| JP | 2011173211 A | 9/2011 | |
| JP | 2012501739 A | 1/2012 | |
| JP | 3179088 U | 10/2012 | |
| JP | 2012532001 | 12/2012 | |
| JP | 2014023773 A | 2/2014 | |
| JP | 2015008938 A | 1/2015 | |
| JP | 2015089386 A | 5/2015 | |
| JP | 2016137146 | 8/2016 | |
| JP | 2020518295 A | 6/2020 | |
| JP | 6860743 B2 | 4/2021 | |
| KR | 10-2008-0048450 A | 6/2008 | |
| KR | 10-2011-0104781 A | 9/2011 | |
| KR | 10-2012-0025571 A | 3/2012 | |
| KR | 10-2014-0062931 A | 5/2014 | |
| KR | 20160020780 A * | 2/2016 | |
| KR | 101812603 B1 | 12/2017 | |
| KR | 10-2020-0052323 A | 5/2020 | |
| KR | 10-2020-0144460 A | 12/2020 | |
| KR | 10-2021-0033449 A | 3/2021 | |
| SU | 251758 | 11/1970 | |
| WO | 8603816 A1 | 7/1986 | |
| WO | 9722782 A1 | 6/1997 | |
| WO | 0004852 A1 | 2/2000 | |
| WO | 2009081710 A1 | 7/2009 | |
| WO | 2010124172 A2 | 10/2010 | |
| WO | 2011043095 A1 | 4/2011 | |
| WO | 2012124853 A1 | 9/2012 | |
| WO | 2013142777 A1 | 9/2013 | |
| WO | 2013152929 A1 | 10/2013 | |
| WO | 2015080596 A1 | 6/2015 | |
| WO | 2015104832 A1 | 7/2015 | |
| WO | WO-2015104832 A1 * | 7/2015 | A61H 1/0244 |
| WO | 2016166442 A1 | 10/2016 | |
| WO | 2016166588 A1 | 10/2016 | |
| WO | 2016171548 A1 | 10/2016 | |
| WO | 2016207855 A1 | 12/2016 | |
| WO | 2017110453 A1 | 6/2017 | |
| WO | WO-2017110453 A1 * | 6/2017 | A61H 1/02 |
| WO | 2018144937 A1 | 8/2018 | |
| WO | 2018191710 A1 | 10/2018 | |
| WO | 2018218336 A1 | 12/2018 | |
| WO | 2018236225 A1 | 12/2018 | |
| WO | 2019122364 A1 | 6/2019 | |
| WO | 2019183397 A1 | 9/2019 | |
| WO | 2019187030 A1 | 10/2019 | |
| WO | 2020049886 A1 | 3/2020 | |
| WO | 2021096874 A1 | 5/2021 | |

OTHER PUBLICATIONS

English translation for WO 2015104832, machine translated my Search Clarivate Analytics, translated on Feb. 17, 2023.*
English translation for WO 2017110453, machine translated my Search Clarivate Analytics, translated on Feb. 17, 2023.*
English translation for JP 2007282991, machine translated my Search Clarivate Analytics, translated on Feb. 17, 2023.*
English translation for KR 10-2016-0020780, machine translated my Search Clarivate Analytics, translated on Feb. 18, 2023.*
Chinese Patent Office Decision on Rejection dated Nov. 25, 2022; Application No. 201880024597; 11 pages.
Chinese Patent Office Decision on Rejection dated Oct. 10, 2022; Application No. 201880024597; 11 pages.
Chinese Patent Office Notification to Grant Patent Right for Invention dated Nov. 4, 2022; Application No. 201880056518.3; 2 pages.
Chinese Patent Office Second Office Action and Supplementary Search Report dated Apr. 25, 2022; Application No. 201880023218.5; 15 pages.
Chinese Patent Office Second Office Action and Supplementary Search Report dated Mar. 30, 2022; Application No. 201880024598; 15 pages.
Chinese Patent Office Second Office Action dated Jul. 13, 2022; Application No. 201880056518.3; 6 pages.
Chinese Patent Office Supplemental Search Report dated Jul. 4, 2022, Application No. 201880056518.3, 4 pages.
Chinese Patent Office Third Office Action dated Oct. 20, 2022; Application No. 201880023218.5; 8 pages.
European Patent Office Communication under Rule 71(3) EPC dated Apr. 19, 2022, Application No. 18 850 236.3, 46 pages.
European Patent Office Communication under Rule 71(3) EPC dated Nov. 29, 2022, Application No. 18 783 814.9, 46 pages.
European Patent Office Communication Under Rule 71(3) EPC, Application No. 18 783 814.9 dated Aug. 11, 2022, 44 pages.
European Patent Office Extended Search Report dated Oct. 18, 2022, Patent Application No. 22181044.3-1122, 7 pages.
European Patent Office Notice of Intention to Grant, Application No. 18783814.9, dated Nov. 29, 2022, 8. pages.
Huang et al., "Interactive learning for sensitivity factors of a human-powered augmentation lower exoskeleton," 2015 IEEE/RSJ International Conference on Intelligent Robots and Systems (IROS), Sep. 28, 2015, 7 pages.

(56) References Cited

OTHER PUBLICATIONS

International Search Report and Written Opinion dated Apr. 26, 2018, International Patent Application No. PCT/US2018/016729, filed Feb. 2, 2018, 7 pages.
International Search Report and Written Opinion dated Aug. 26, 2021, Patent Application No. PCT/US2021/034444, 7 pages.
International Search Report and Written Opinion dated Aug. 26, 2021, Patent Application No. PCT/US2021/034447, 7 pages.
International Search Report and Written Opinion dated Aug. 26, 2021, Patent Application No. PCT/US2021/034593, 10 pages.
International Search Report and Written Opinion dated Dec. 1, 2022, Patent Application No. PCT/US2022/075098, 12 pages.
International Search Report and Written Opinion dated Dec. 1, 2022, Patent Application No. PCT/US2022/075099, 12 pages.
International Search Report and Written Opinion dated Dec. 5, 2022, Patent Application No. PCT/US2022/075097, 11 pages.
International Search Report and Written Opinion dated Dec. 6, 2018, International Patent Application No. PCT/US2018/048638, filed Aug. 29, 2018, 8 pages.
International Search Report and Written Opinion dated Dec. 6, 2018, Patent Application No. PCT/US2018/048639, 7 pages.
International Search Report and Written Opinion dated Dec. 6, 2022, Patent Application No. PCT/US2022/075095, 10 pages.
International Search Report and Written Opinion dated Jul. 18, 2016, International Patent Application No. PCT/US2016/024366, filed Mar. 25, 2016, 7 pages.
International Search Report and Written Opinion dated Jul. 19, 2018, International Patent Application No. PCT/US2018/027643, filed Apr. 13, 2018, 7 pages.
International Search Report and Written Opinion dated Jun. 3, 2021, Patent Application No. PCT/US2021/019711, 12 pages.
International Search Report and Written Opinion dated Mar. 30, 2021, Patent Application No. PCT/US2020/064647, 10 pages.
International Search Report and Written Opinion dated Nov. 29, 2022, International Patent Application No. PCT/US2022/075094, filed Aug. 17, 2022, 11 pages.
International Search Report and Written Opinion dated Nov. 29, 2022, International Patent Application No. PCT/US2022/075096, filed Aug. 17, 2022, 11 pages.
International Search Report and Written Opinion dated Sep. 2, 2021, Patent Application No. PCT/US2021/034030, 9 pages.
International Search Report and Written Opinion dated Sep. 2, 2021, Patent Application No. PCT/US2021/034450, 9 pages.
International Search Report and Written Opinion dated Sep. 9, 2021, Patent Application No. PCT/US2021/034443, 8 pages.
International Search Report and Written Opinion dated Sep. 9, 2021, Patent Application No. PCT/US2021/034579, 8 pages.
International Search Report and Writtent Opinion dated Aug. 26, 2021, Patent Application No. PCT/US2021/034468, 8 pages.
Israel Notice of Acceptance for Patent Application No. 272621 dated Dec. 22, 2022, 4 pages.
Israel Notice of Deficiencies for Patent Application No. 269860 dated Jul. 25, 2022, 5 pages.
Israel Notice of Deficiencies for Patent Application No. 272623 dated Dec. 7, 2022, 4 pages.
Israel Notice of Deficiencies for Patent Application No. 282165 dated Dec. 18, 2022, 4 pages.
Japan Decision to Grant Application No. 2020-512042 dated Jan. 13, 2023, 2 pages.
Japan Final Office Action and Decision to Reject Amendment of Application No. 2019-554877 dated Nov. 7, 2022, 4 pages.
Japan Final Rejection of Application No. 2019-563328 dated Jul. 6, 2022, 2 pages.
Japan Patent Office, "Final Rejection" in Applicaiton No. 2019-563328, dated Sep. 9, 2022, 4 pages.
Japanese IPO Final Rejection of Application No. 2019-563328, dated Aug. 9, 2022, 2 pages.
Japanese IPO Notification of Reason for Rejection of Application No. 2020-512042, dated Jun. 27, 2022, 2 pages.
National Intellectual Property Administration, P. R. China, "2nd Office Action" in Application No. 201880023218.5, dated Apr. 25, 2022, 15 pages.
Notification of Grant of Chinese Patent Application No. 201880056709 dated May 18, 2022, 2 pages.
Tamez-Duque et al., "Real-time strap pressure sensor system for powered exoskeletons," Sensors 15(2):4550-4563, Feb. 2015.
Taniguchi, "Flexible Artificial Muscle Actuator Using Coiled Shape Memory Alloy Wires," APCBEE Procedia 7:54-59, Jan. 1, 2013.
USPTO Office Action in U.S. Appl. No. 16/827,484 dated Mar. 15, 2023, 13 pages.
USPTO Office Action in U.S. Appl. No. 16/862,400 dated Mar. 22, 2023, 13 pages.
USPTO Office Action in U.S. Appl. No. 17/558,481 dated Mar. 23, 2023, 49 pages.
Branham, "3 Advantages of Using an Oval Bore Compact Cylinder," W.C. Branham Blog—Solutions in Motion TM. Retrieved Feb. 9, 2023, from https://blog.wcbranham.com/oval-bore-compact-cylinder, Jan. 12, 2018, 7 pages.
Israel Notice of Acceptance for Patent Application No. 268306 dated Feb. 1, 2023, 3 pages.
U.S. Appl. No. 15/953,296, filed Apr. 13, 2018.
U.S. Appl. No. 15/887,866, filed Feb. 2, 2018.
U.S. Appl. No. 15/823,523, filed Nov. 27, 2017.
U.S. Appl. No. 15/082,824, filed Mar. 28, 2016.
Canadian IPO Office Action and Examination Search Report dated Mar. 21, 2023, 7 pages.
Chinese Patent Office Fourth Office Action dated Mar. 31, 2023, Application No. 201880023218.5; 7 pages.
Japan First Office Action, Application No. 2022-072995 dated Mar. 8, 2023, 2 pages.
USPTO Office Action in U.S. Appl. No. 17/119,825 dated May 23, 2023, 19 pages.
European Patent Office Notice of Intention to Grant, Application No. 18748599.0, dated Aug. 16, 2023, 52 pages.
Israel Notice before Acceptance for Patent Application No. 282165 dated May 24, 2023, 3 pages.
Japan PTO Rejection of Application No. 2019-563328 dated Jul. 13, 2023, 3 pages.
Chinese Patent Office First Office Action dated Jun. 16, 2023; Application No. 202111540872.3; 14 pages.
Chinese Patent Office Notification to Grant Patent Right for Invention dated Jul. 10, 2023; Application No. 201880024597.X; 2 pages.
USPTO Office Action in U.S. Appl. No. 17/332,172 dated Oct. 25, 2023, 39 pages.

* cited by examiner

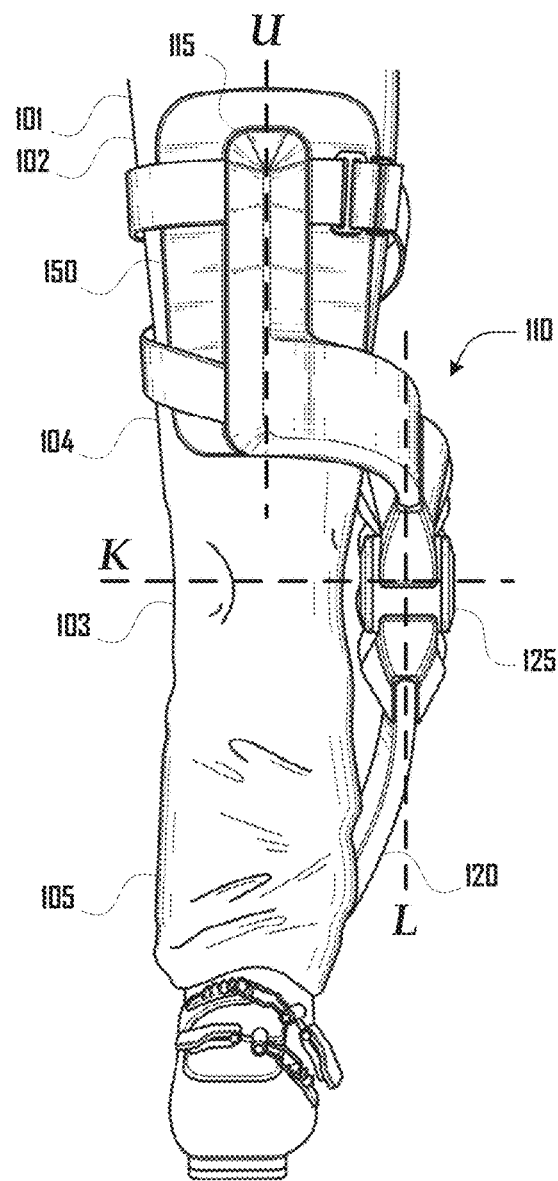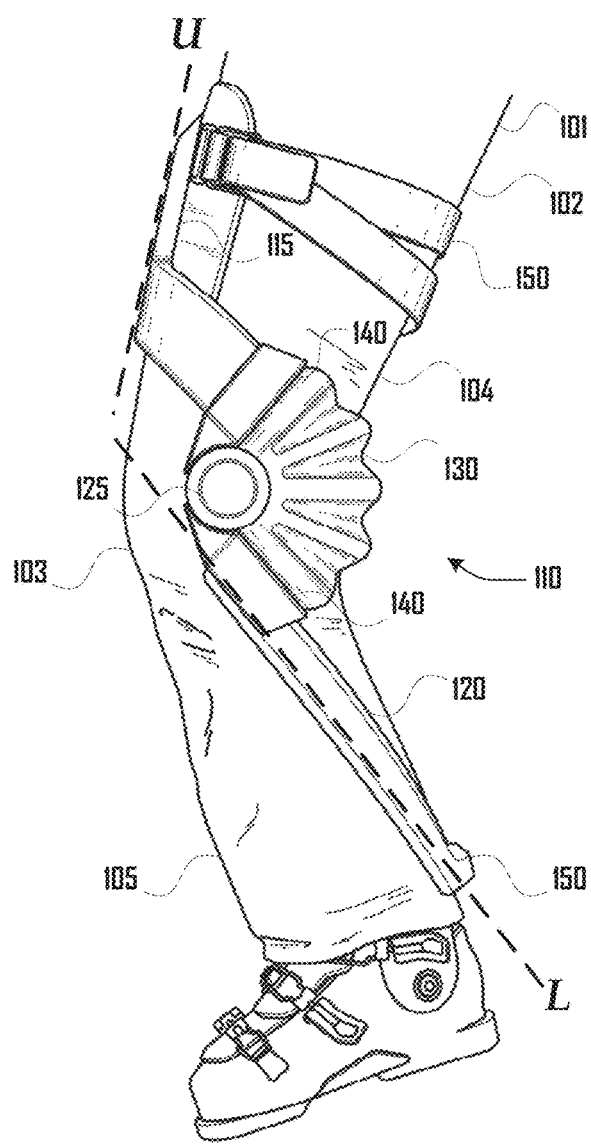

SEMI-SUPERVISED INTENT RECOGNITION SYSTEM AND METHOD

CROSS-REFERENCE TO RELATED APPLICATIONS

This application is a continuation of U.S. patent application Ser. No. 16/116,246, filed Aug. 29, 2018, which is a non-provisional of, and claims the benefit of, provisional U.S. Patent Application No. 62/551,696, filed Aug. 29, 2017, which applications are hereby incorporated herein by reference in their entirety and for all purposes.

This application is also related to U.S. patent application Ser. No. 15/953,296, filed Apr. 13, 2018, and is related to U.S. patent application Ser. No. 15/887,866, filed Feb. 2, 2018, and is related to U.S. patent application Ser. No. 15/823,523, filed Nov. 27, 2017, and is related to U.S. patent application Ser. No. 15/082,824, filed Mar. 28, 2016, which applications are also hereby incorporated herein by reference in their entirety and for all purposes.

BRIEF DESCRIPTION OF THE DRAWINGS

FIGS. 4a and 4b are example illustrations of a still further embodiment of an exoskeleton system being worn on the leg of a user.

Figure 1:
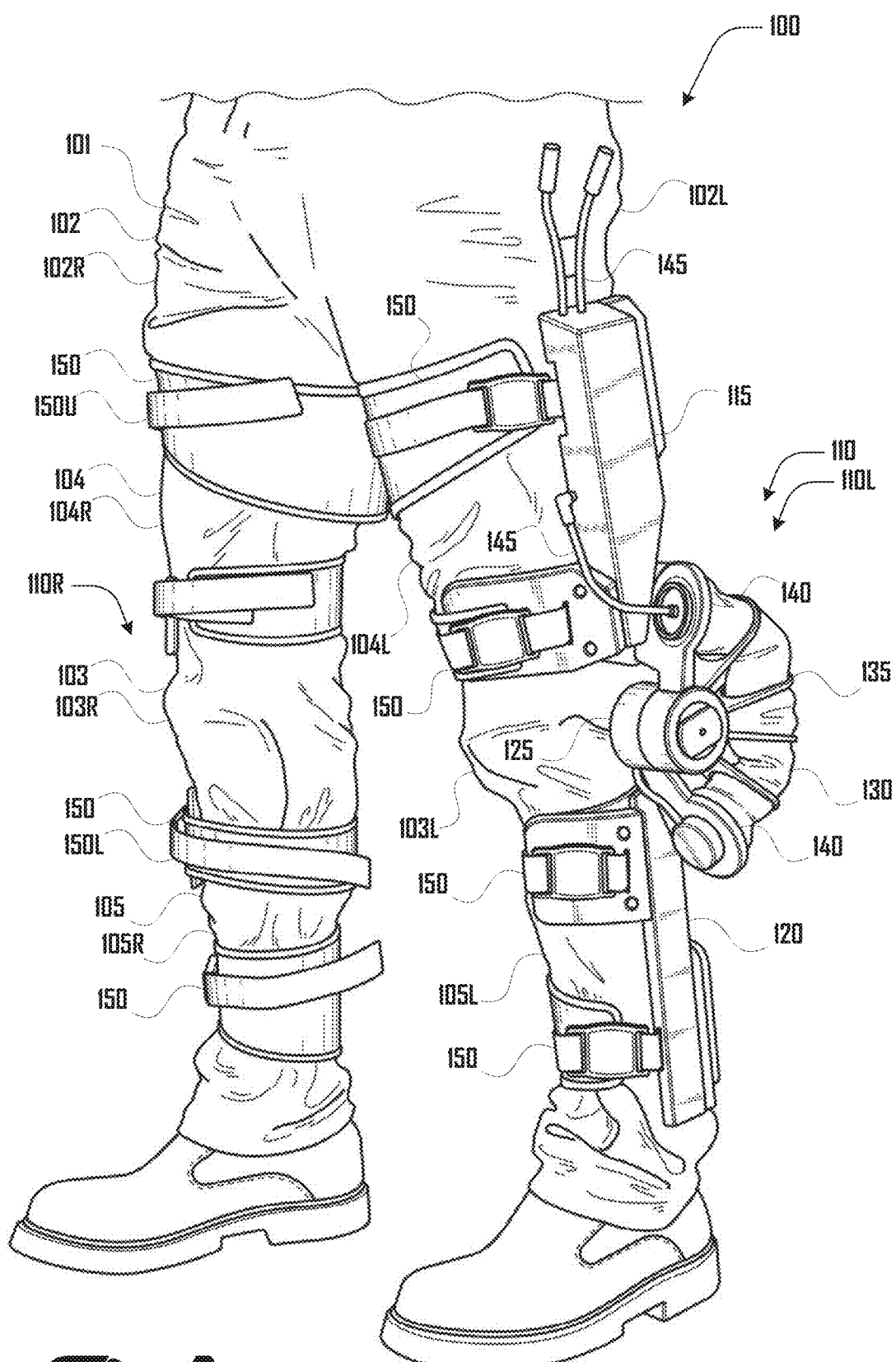
FIG. 1 is an example illustration of an embodiment of an exoskeleton system being worn by a user.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

This application discloses example embodiments pertaining to the design and implementation of novel systems and methods for the recognition of the intent of users of a powered exoskeleton. In various embodiments, methods for intent recognition in exoskeleton devices, in their simplest form, can allow the user to provide direct indication of their intent through manual entry (by using buttons, for example), while other methods can be designed to eliminate dependence on direct interaction for normal operation. This disclosure describes systems and methods that in various examples allow a user to provide input that may improve the accuracy of a device's intent recognition without slaving the device to user commands.

The embodiments described herein offer a substantial improvement over alternative methods of intent recognition in exoskeletons. For example, one alternative method for intent recognition in exoskeleton devices is a fully supervised approach that provides the user or a device proctor (e.g., a physical therapist) the ability to directly indicate a desired change in the user's intended behavior. These methods can tie triggers in state behavior of the device directly to manual inputs, but this requires the user to indicate a wide variety of behaviors such as sitting, standing, going up or down stairs, walking, running and the like.

In an effort to reduce the user's direct involvement in the device behavior, in another alternative unsupervised methods have been developed that use device sensors to automatically determine the user's intended maneuver without direct interaction from the operator. This reduces the burden on the user and presents the potential to increase the number of operational modes the device can recognize, but it introduces the risk of false intent recognition. Some methods have been developed which use a combination of automated and direct identification, but they still present the same challenges. Various systems and methods described herein allow the operator to directly provide information to the device, without the input of the operator directly manipulating the operating state of the exoskeleton.

This disclosure teaches methods for developing various embodiments of a semi-supervised intent recognition method. This approach can allow an operator to provide the device with additional information that the device can use to manipulate the behavior of the device. In these embodiments, the user can provide direct input to the machine to enhance its decision making ability without directly dictating the decisions to be made.

In some embodiments, the direct input provided by the user is not correlated directly with a specific maneuver (e.g., taking a step). Another embodiment provides the user with only a single input of direct intent indication through the source of a button. In this embodiment, this button does not correlate with a specific maneuver such as walking, running, or standing. Instead, the button only indicates the user's desire or intent to change behavior. In one example, if the operator is walking and plans to transition to standing or running, the user would only need to push the state transition intention button to alert the device to anticipate a potential decision. In such an embodiment, the device behavior is not being fully supervised or directly manipulated by the user's indicated intent. Instead, when the user specifies that a change in intent is possibly coming, the device can implement a method to be more sensitive to responding to user behaviors and then respond accordingly, such as assisting the user in physically transitioning from walking to running or standing, or even doing nothing.

In further embodiments, the direct input provided by the user can be correlated with a specific maneuver but the device is still not directly manipulated by the indicated intent. An embodiment can include a user in the sitting position wearing the device, where the device has a single button. In this position, even if the button is typically used to describe a change in intended behavior, from a sitting position the only valid change in behavior for this device in this embodiment is to stand up. As a result, a single button press can be directly correlated with a single maneuver, such as a sit-to-stand transition. However, in this embodiment, the device may not be directly supervised by the user's indicated intent. As a result, the device does not change behavior immediately or as a direct reaction to the press of the button but instead becomes more sensitive to detecting a sit-to-stand transition initiated by the user.

An exoskeleton system can respond in a variety of ways to the semi-supervised intent of the operator. In one embodiment, the exoskeleton device can use the indication of intent from the operator to begin monitoring the device sensors to look for change in behavior. In another embodiment, the indicated intent can be used to increase the sensitivity of a set of unsupervised intent recognition methods that are already running. This can be done by allowing the exoskeleton device to lower the required confidence to initiate a change in intended maneuver. In yet another embodiment, the indicated intent can be treated as just another sensor input. The device can then provide the user's indicated intent along with the device sensors into a traditionally unsupervised intent recognition method. This can be desirable in the case of using data driven intent recognition algorithms that leverage machine learning algorithms to infer the appropriate points of change in intent. It is important to note that the previously described embodiments are descriptive but not inclusive of all the potential additional embodiments that can leverage the semi-supervised indication of user intent and should therefore not be construed to be limiting.

In various embodiments, a user can provide the exoskeleton device with a semi-supervised manual indication of intent through a variety of input methods. In no way does the source of the input method limit or restrict the application of the disclosed systems and methods when it comes to incorporating the semi-supervised input to form a better estimate of the user's intended behavior. Some of the potential input methods include, but are not limited to, the following: physical button attached to the device; unique button press (e.g., double click or long press); discrete gesture (e.g., wave arms, tap foot); spoken commands; mobile device interface; interpreted manual input through another sensor input (e.g., inferring a knock on the device through watching an IMU signal); and the like.

For the purpose of clarity, example embodiments are discussed in the context of design and implementation of exoskeleton systems (e.g., as shown in FIG. 1); however, systems and methods described and shown herein can have application to a wide range of worn devices where the device is using onboard sensors for the purpose of recognizing the intended behavior of the user. A specific example of this is footwear, specifically active footwear, where the device uses included sensors to determine the intended behavior of the operator such that it can report statistics or adapt the performance characteristics for the user. In these applications, the designers will be met with the same issues surrounding balancing the safety of a fully supervised intent recognizer with the usability of an unsupervised option. The application of a semi-supervised method as disclosed in this document can be a solution to balancing these needs in other powered worn devices as well.

Turning to FIG. 1, an example of an embodiment of an exoskeleton system 100 being worn by a human user 101 is illustrated. As shown in this example, the exoskeleton system 100 comprises a left and right leg actuator unit 110L, 110R that are respectively coupled to a left and right leg 102L, 102R of the user. In this example illustration, portions of the right leg actuator unit 110R are obscured by the right leg 102R; however, it should be clear that in various embodiments the left and right leg actuator units 110L, 110R can be substantially mirror images of each other.

The leg actuator units 110 can include an upper arm 115 and a lower arm 120 that are rotatably coupled via a joint 125. A bellows actuator 130 extends between plates 140 that are coupled at respective ends of the upper arm 115 and lower arm 120, with the plates 140 coupled to separate rotatable portions of the joint 125. A plurality of constraint ribs 135 extend from the joint 125 and encircle a portion of the bellows actuator 130 as described in more detail herein. One or more sets of pneumatic lines 145 can be coupled to the bellows actuator 130 to introduce and/or remove fluid from the bellows actuator 130 to cause the bellows actuator 130 to expand and contract as discussed herein.

The leg actuator units 110L, 110R can be respectively coupled about the legs 102L, 102R of the user 101 with the joints 125 positioned at the knees 103L, 103R of the user 101 with the upper arms 115 of the leg actuator units 110L, 110R being coupled about the upper legs portions 104L, 104R of the user 101 via one or more couplers 150 (e.g., straps that surround the legs 104). The lower arms 120 of the leg actuator units 110L, 110R can be coupled about the lower leg portions 105L, 105R of the user 101 via one or more couplers 150. As shown in the example of FIG. 1, an upper arm 115 can be coupled to the upper leg portion 104 of a leg 102 above the knee 103 via two couplers 150 and the lower arm 120 can be coupled to the lower leg portion 105 of a leg 102 below the knee 103 via two couplers 150. It is important to note that some of these components can be omitted in certain embodiments, some of which are discussed within. Additionally, in further embodiments, one or more of the components discussed herein can be operably replaced by an alternative structure to produce the same functionality.

Figure 2:
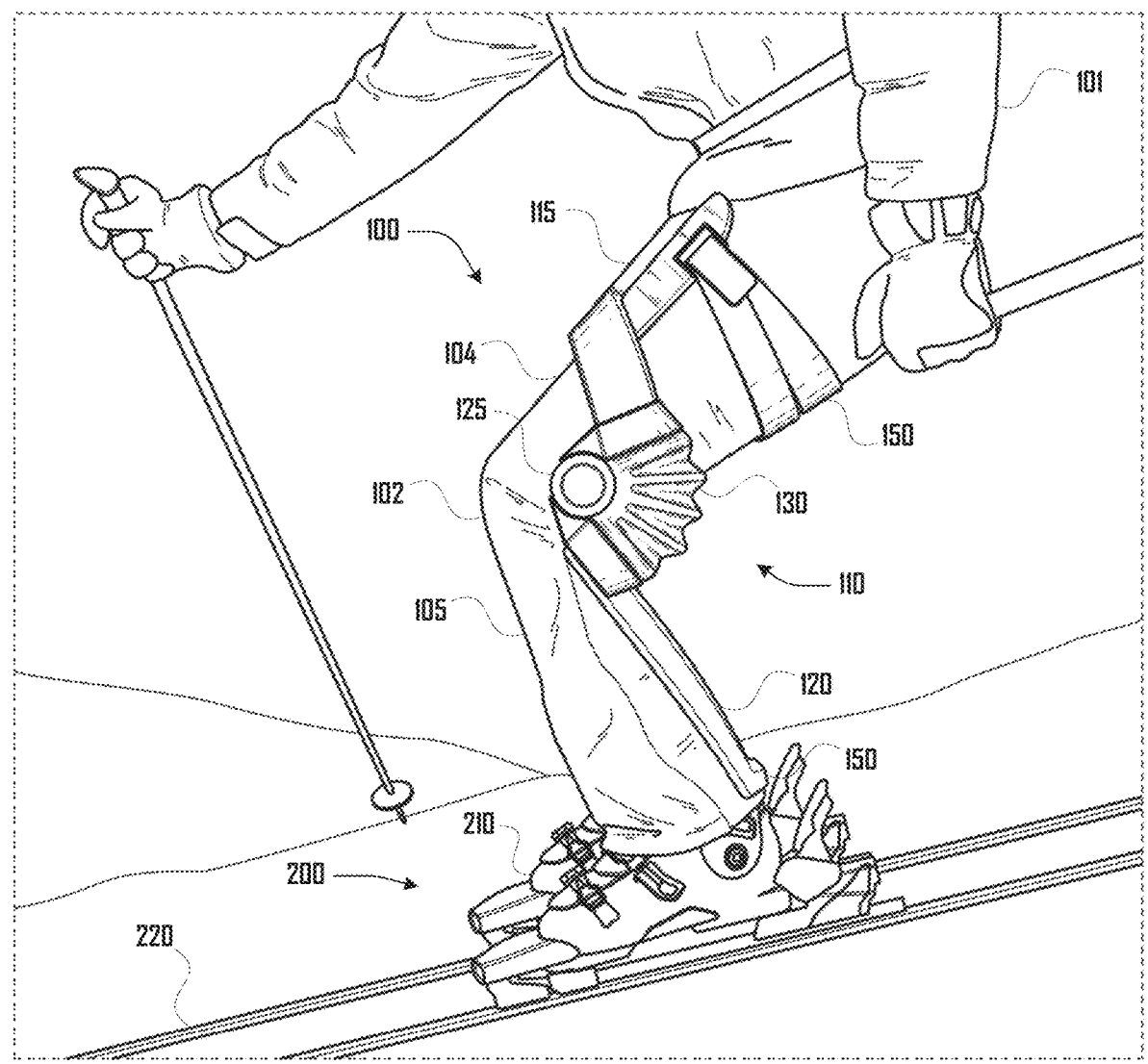
FIG. 2 is an example illustration of another embodiment of an exoskeleton system being worn by a user while skiing.
Figure 3:
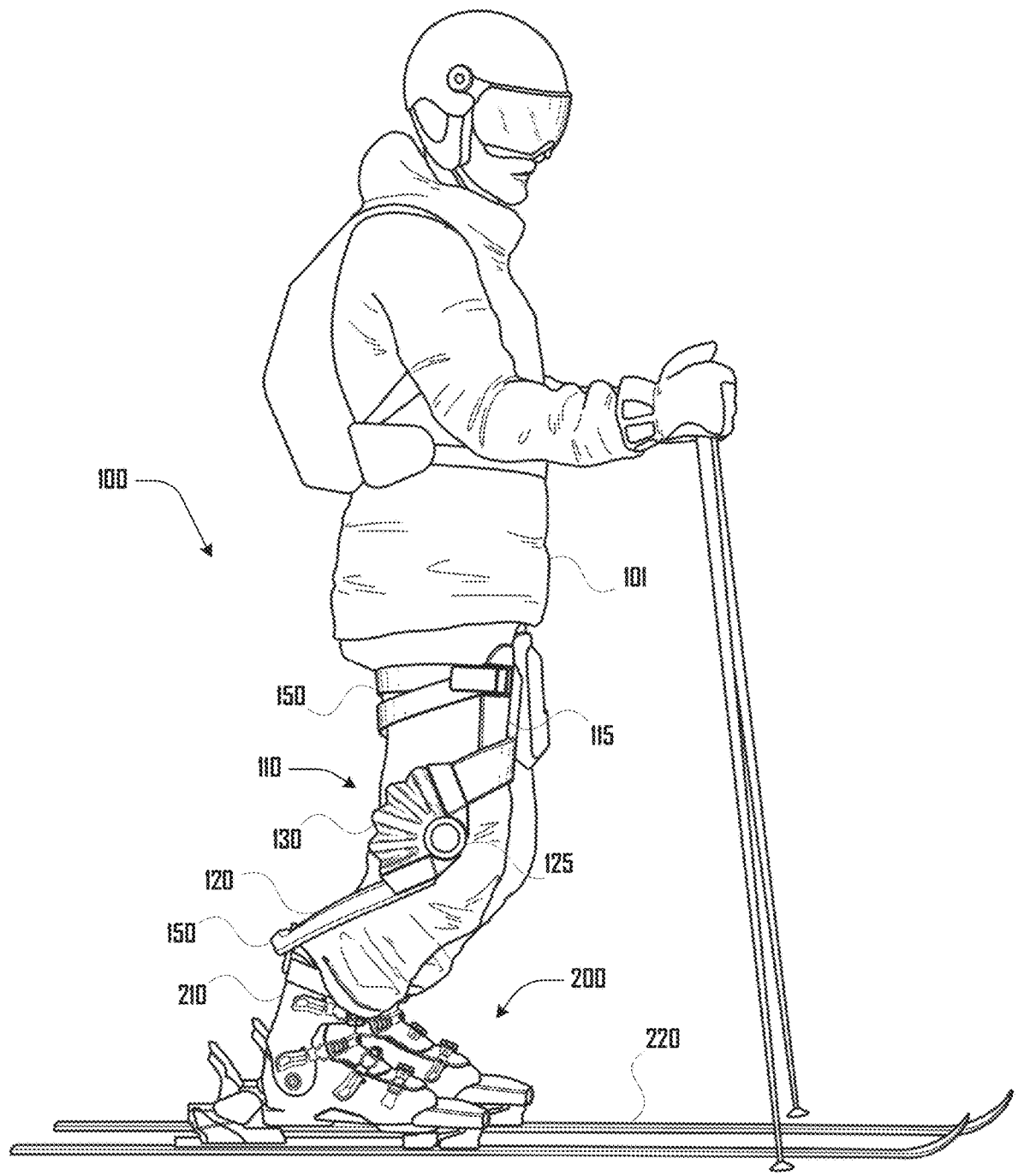
FIG. 3 is an example illustration of a further embodiment of an exoskeleton system being worn by a user while skiing.

As discussed herein, an exoskeleton system 100 can be configured for various suitable uses. For example, FIGS. 2 and 3 illustrate an exoskeleton system 100 being used by a user during skiing. As shown in FIGS. 2 and 3 the user can wear the exoskeleton system 100 and a skiing assembly 200 that includes a pair of ski boots 210 and pair of skis 220. In various embodiments, the lower arms 120 of the leg actuator units 110 can be removably coupled to the ski boots 210 via a coupler 150. Such embodiments can be desirable for directing force from the leg actuator units 110 to the skiing assembly. For example, as shown in FIGS. 2 and 3, a coupler 150 at the distal end of the lower arm 120 can couple the leg actuator unit 110 to the ski boot 210 and a coupler 150 at the distal end of the upper arm 115 can couple the leg actuator unit 110 to the upper leg 104 of the user 101.

The upper and lower arms 115, 120 of a leg actuator unit 110 can be coupled to the leg 102 of a user 101 in various suitable ways. For example, FIG. 1 illustrates an example where the upper and lower arms 115, 120 and joint 125 of the leg actuator unit 110 are coupled along lateral faces of the top and bottom portions 104, 105 of the leg 102. FIGS. 4a and 4b illustrate another example of an exoskeleton system 100 where the joint 125 is disposed laterally and adjacent to the knee 103 with a rotational axis K of the joint 125 being disposed coincident with a rotational axis of the knee 103. The upper arm 115 can extend from the joint 125 along a lateral face of the upper leg 104 to an anterior face of the upper leg 104. The portion of the upper arm 115 on the anterior face of the upper leg 104 can extend along an axis U. The lower arm 120 can extend from the joint 125 along a lateral face of the lower leg 105 from a medial location at the joint 125 to a posterior location at a bottom end of the lower leg 105 with a portion extending along axis L that is perpendicular to axis K.

In various embodiments, the joint structure 125 can constrain the bellows actuator 130 such that force created by actuator fluid pressure within the bellows actuator 130 can be directed about an instantaneous center (which may or may not be fixed in space). In some cases of a revolute or rotary joint, or a body sliding on a curved surface, this instantaneous center can coincide with the instantaneous center of rotation of the joint 125 or a curved surface. Forces created by a leg actuator unit 110 about a rotary joint 125 can be used to apply a moment about an instantaneous center as well as still be used to apply a directed force. In some cases of a prismatic or linear joint (e.g., a slide on a rail, or the like), the instantaneous center can be kinematically considered to be located at infinity, in which case the force directed about this infinite instantaneous center can be considered as a force directed along the axis of motion of the prismatic joint. In various embodiments, it can be sufficient for a rotary joint 125 to be constructed from a mechanical pivot mechanism. In such an embodiment, the joint 125 can have a fixed center of rotation that can be easy to define, and the bellows actuator 130 can move relative to the joint 125. In a further embodiment, it can be beneficial for the joint 125 to comprise a complex linkage that does not have a single fixed center of rotation. In yet another embodiment, the joint 125 can comprise a flexure design that does not have a fixed joint pivot. In still further embodiments, the joint 125 can comprise a structure, such as a human joint, robotic joint, or the like.

In various embodiments, leg actuator unit 110 (e.g., comprising bellows actuator 130, joint structure 125, constraint ribs 135 and the like) can be integrated into a system to use the generated directed force of the leg actuator unit 110 to accomplish various tasks. In some examples, a leg actuator unit 110 can have one or more unique benefits when the leg actuator unit 110 is configured to assist the human body or is included into a powered exoskeleton system 100. In an example embodiment, the leg actuator unit 110 can be configured to assist the motion of a human user about the user's knee joint 103. To do so, in some examples, the instantaneous center of the leg actuator unit 110 can be designed to coincide or nearly coincide with the instantaneous center of rotation of the knee (e.g., aligned along common axis K as shown in FIG. 4a). In one example configuration, the leg actuator unit 110 can be positioned lateral to the knee joint 103 as shown in FIGS. 1, 2, 3, and 4a (as opposed to in front or behind). In another example configuration, the leg actuator unit 110 can be positioned behind the knee 103, in front of the knee 103, on the inside of the knee 103, or the like. In various examples, the human knee joint 103 can function as (e.g., in addition to or in place of) the joint 125 of the leg actuator unit 110.

For clarity, example embodiments discussed herein should not be viewed as a limitation of the potential applications of the leg actuator unit 110 described within this disclosure. The leg actuator unit 110 can be used on other joints of the body including but not limited to the elbow, hip, finger, spine, or neck, and in some embodiments, the leg actuator unit 110 can be used in applications that are not on the human body such as in robotics, for general purpose actuation, or the like.

Some embodiments can apply a configuration of a leg actuator unit 110 as described herein for linear actuation applications. In an example embodiment, the bellows 130 can comprise a two-layer impermeable/inextensible construction, and one end of the constraining ribs 135 can be fixed to the bellows 130 at predetermined positions. The joint structure 125 in various embodiments can be configured as a series of slides on a pair of linear guide rails, where the remaining end of each constraining rib 135 is connected to a slide. The motion and force of the fluidic actuator can therefore be constrained and directed along the linear rail.

Figure 5:
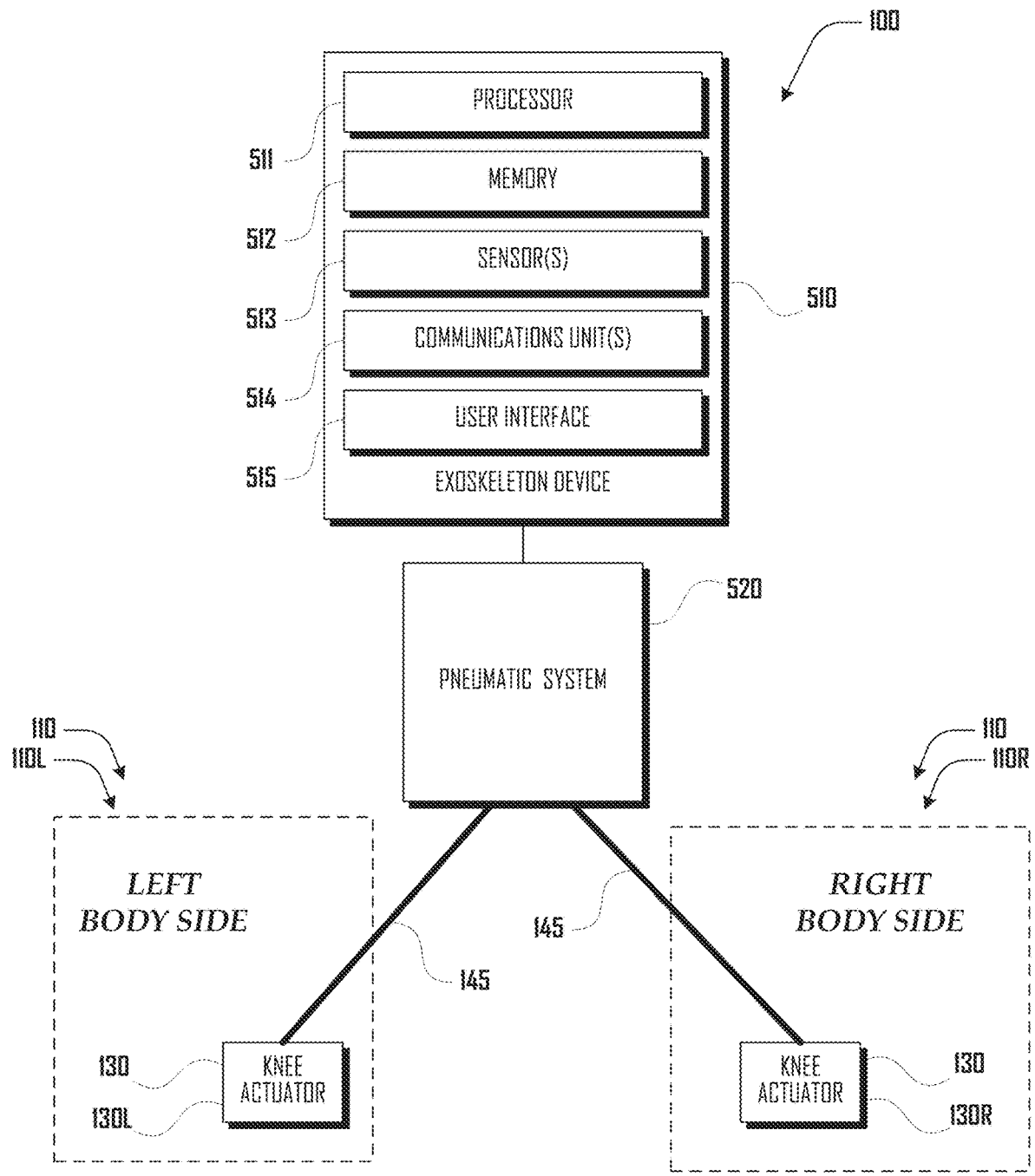
FIG. 5 is a block diagram illustrating an embodiment of an exoskeleton system.

FIG. 5 is a block diagram of an example embodiment of an exoskeleton system 100 that includes an exoskeleton device 510 that is operably connected to a pneumatic system 520. The exoskeleton device 510 comprises a processor 511, a memory 512, one or more sensors 513, a communication unit 514 and a user interface 515. A plurality of actuators 130 are operably coupled to the pneumatic system 520 via respective pneumatic lines 145. The plurality of actuators 130 includes a pair of knee-actuators 130L, 130R that are positioned on the right and left side of a body 100. For example, as discussed above, the example exoskeleton system 100 shown in FIG. 5 can comprise a left and right leg actuator unit 110L, 110R on respective sides of the body 101 as shown in FIGS. 1-3.

In various embodiments, the example system 100 can be configured to move and/or enhance movement of the user wearing the exoskeleton system 110. For example, the exoskeleton device 510 can provide instructions to the pneumatic system 520, which can selectively inflate and/or deflate the bellows actuators 130 via pneumatic lines 145. Such selective inflation and/or deflation of the bellows actuators 130 can move one or both legs 102 to generate and/or augment body motions such as walking, running, jumping, climbing, lifting, throwing, squatting, skiing or the like. In further embodiments, the pneumatic system 520 can be manually controlled, configured to apply a constant pressure, or operated in any other suitable manner.

In some embodiments, such movements can be controlled and/or programmed by the user 101 that is wearing the exoskeleton system 100 or by another person. In some embodiments, the exoskeleton system 100 can be controlled by movement of the user. For example, the exoskeleton device 510 can sense that the user is walking and carrying a load and can provide a powered assist to the user via the actuators 130 to reduce the exertion associated with the load and walking. Similarly, where a user 101 wears the exoskeleton system 100 while skiing, the exoskeleton system 100 can sense movements of the user 101 (e.g., made by the user 101, in response to terrain, or the like) and can provide a powered assist to the user via the actuators 130 to enhance or provide an assist to the user while skiing.

Accordingly, in various embodiments, the exoskeleton system 130 can react automatically without direct user interaction. In further embodiments, movements can be controlled in real-time by a controller, joystick or thought control. Additionally, some movements can be pre-preprogrammed and selectively triggered (e.g., walk forward, sit, crouch) instead of being completely controlled. In some embodiments, movements can be controlled by generalized instructions (e.g., walk from point A to point B, pick up box from shelf A and move to shelf B).

In various embodiments, the exoskeleton device 100 can be operable to perform methods or portions of methods described in more detail below or in related applications incorporated herein by reference. For example, the memory 512 can include non-transient computer readable instructions, which if executed by the processor 511, can cause the exoskeleton system 100 to perform methods or portions of methods described herein or in related applications incorporated herein by reference. The communication unit 514 can include hardware and/or software that allows the exoskeleton system 100 to communicate with other devices, including a user device, a classification server, other exoskeleton systems, or the like, directly or via a network.

In some embodiments, the sensors 513 can include any suitable type of sensor, and the sensors 513 can be located at a central location or can be distributed about the exoskeleton system 100. For example, in some embodiments, the exoskeleton system 100 can comprise a plurality of accelerometers, force sensors, position sensors, pressure sensors and the like, at various suitable positions, including at the arms 115, 120, joint 125, actuators 130 or any other location. Accordingly, in some examples, sensor data can correspond to a physical state of one or more actuators 130, a physical state of a portion of the exoskeleton system 100, a physical state of the exoskeleton system 100 generally, and the like. In some embodiments, the exoskeleton system 100 can include a global positioning system (GPS), camera, range sensing system, environmental sensors, or the like.

The user interface 515 can include various suitable types of user interfaces, including one or more of a physical button, a touch screen, a smart phone, a tablet computer, a wearable device and the like. For example, in some embodiments the exoskeleton system 100 can comprise an embedded system that includes a user interface 515 or the exoskeleton device 510 can be operably connected to a separate device (e.g., a smart phone) via a wired or wireless communication network (e.g., Bluetooth, Wi-Fi, the Internet, or the like).

The pneumatic system 520 can comprise any suitable device or system that is operable to inflate and/or deflate the actuators 130 individually or as a group. For example, in one embodiment, the pneumatic system can comprise a diaphragm compressor as disclosed in related patent application Ser. No. 14/577,817 filed Dec. 19, 2014 and/or a poppet valve system as described in U.S. patent application Ser. No. 15/083,015, filed Mar. 28, 2016, which issued as U.S. Pat. No. 9,995,321.

As discussed herein, various suitable exoskeleton systems 100 can be used in various suitable ways and for various suitable applications. However, such examples should not be construed to be limiting on the wide variety of exoskeleton systems 100 or portions thereof that are within the scope and spirit of the present disclosure. Accordingly, exoskeleton systems 100 that are more or less complex than the examples of FIGS. 1, 2, 3, 4a, 4b and 5 are within the scope of the present disclosure.

Additionally, while various examples relate to an exoskeleton system 100 associated with the legs or lower body of a user, further examples can be related to any suitable portion of a user body including the torso, arms, head, legs, or the like. Also, while various examples relate to exoskeletons, it should be clear that the present disclosure can be applied to other similar types of technology, including prosthetics, body implants, robots, or the like. Further, while some examples can relate to human users, other examples can relate to animal users, robot users, various forms of machinery, or the like.

As discussed herein, various embodiments relate to a method of semi-supervised intent recognition for wearable devices such as an exoskeleton system 100. Semi-supervised intent recognition methods of various embodiments can be distinguished from fully-supervised intent recognition methods and unsupervised intent recognition methods as described in more detail below.

Figure 6:
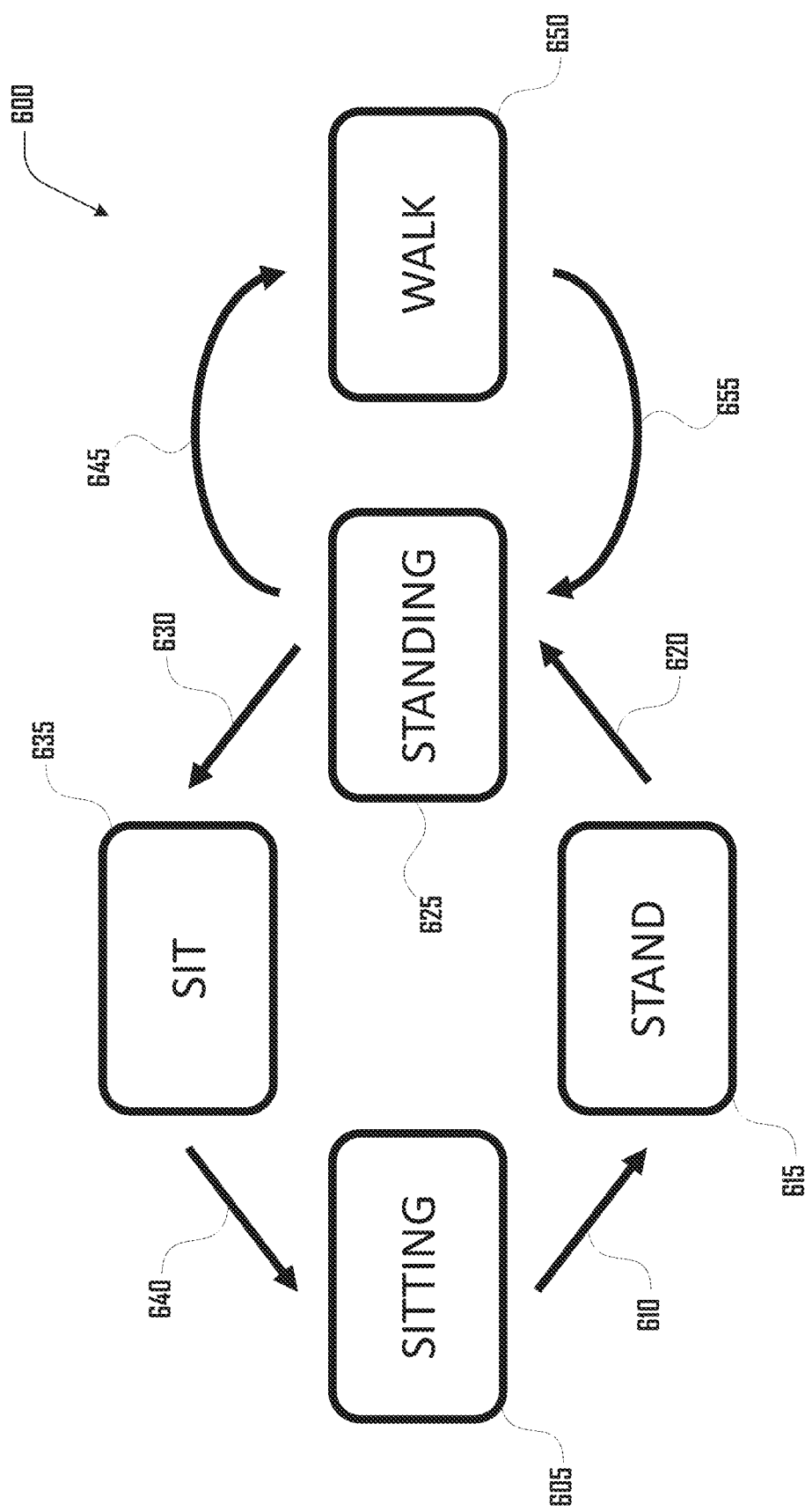
FIG. 6 illustrates an example state machine for an exoskeleton system that includes a plurality of system states and transitions between the system states.

Turning to FIG. 6, an example state machine 600 for an exoskeleton system 100 is illustrated, which includes a plurality of system states and transitions between the system states. More specifically, the state machine 600 is shown comprising a sitting state 605, from which the exoskeleton system 100 can transition to a stand state 615 via a sitting-stand transition 610. The exoskeleton system 100 can transition from the stand state 615 to a standing state 625 via a stand-standing transition 620. The exoskeleton system 100 can transition from the standing state 625 to a sit state 635 via a standing-sit transition 630. The exoskeleton system 100 can transition from the sit state 635 to a sitting state 605 via a sit-sitting transition 640.

For example, where a user 101 is sitting in a chair, the exoskeleton system 100 can be in a sitting state 605 and when the user 101 wants to stand up, the exoskeleton system 100 can move from sitting 605 to standing 620 via the stand state 615, which moves the user 101 from a sitting position to a standing position. Where the user 101 is standing by a chair, the exoskeleton system 100 can be in a standing state 625 and when the user 101 wants to sit in the chair, the exoskeleton system 100 can move from standing 625 to sitting 605 via the sit state 635, which moves the user 101 from a standing position to a sitting position.

Also, as shown in the state machine 600, the exoskeleton system 100 can move from the standing-state 625 to a walk state 650 via a standing-walk transition 645. The exoskeleton system 100 can move from the walk state 650 to the standing state 625 via a walk-standing transition 655. For example, where a user 101 is standing 625, the user 101 can choose to walk 650 and can choose to stop walking 650 and return to standing 625.

The example state machine 600 is used herein for purposes of illustration only and should not be construed to be limiting on the wide variety of state machines for an exoskeleton system 200 that are within the scope and sprit of the present disclosure. For example, some embodiments can include a simpler state machine having only standing and walking states 625, 650. Further embodiments can include additional states such as a running state from the walking state 650, or the like.

Figure 7:
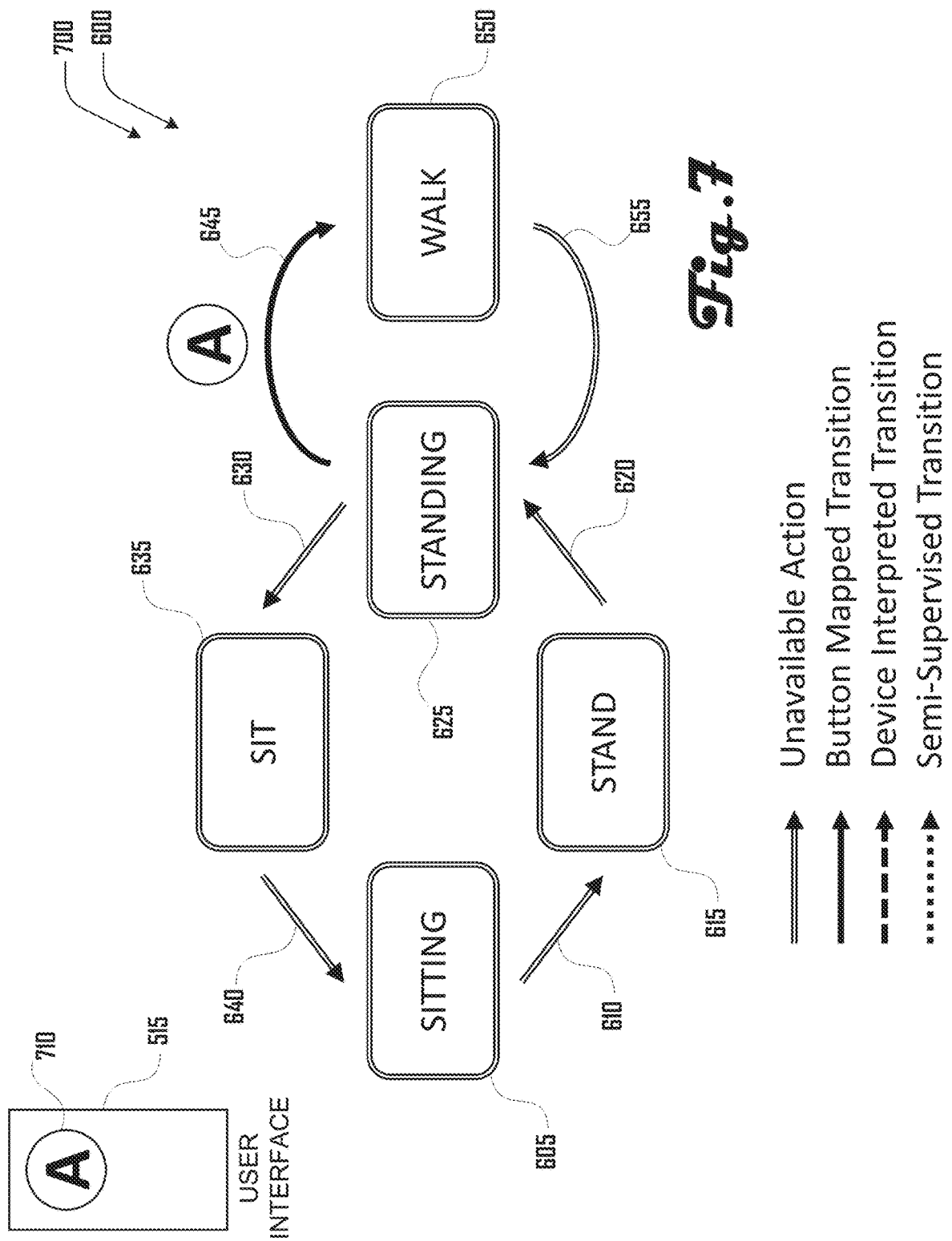
FIG. 7 is an example of a fully supervised intent recognition method illustrated in the context of the state machine of FIG. 6 and a user interface having a first button.

Turning to FIG. 7, an example of a fully-supervised intent recognition method 700 is illustrated in the context of the state machine 600 of FIG. 6 and a user interface 515 (see FIG. 5) having an A-button 710. In a fully-supervised state machine of various examples, the user 101 provides a direct manual input to an interface 515 to dictate the initiation of a single unique transition from one state to another, upon which the exoskeleton system 100 is slaved to initiate that transition. In this example, that manual input is represented by a button press of the A-button 710. The A-Button 710 is shown mapped to a single transition (i.e., standing-walk transition 645) from a standing state 625 to a walk state 650. If button A is pressed and the exoskeleton system 100 detects that the user 101 is in a safe configuration to initiate a transition to walking 650, the exoskeleton system 100 will initiate a transition 645 to the walk state 650 from the standing state 625. In other words, in this example, Button A can only trigger the standing-walk transition 645 from the standing state 625 to the walking state 650, with all other transitions (i.e., 610, 620, 630, 640, 655) being unavailable via a button press of the A-Button 710. This transition, if successfully completed, will result in the device wearer to physically transition from standing to walking in this example.

Figure 8:
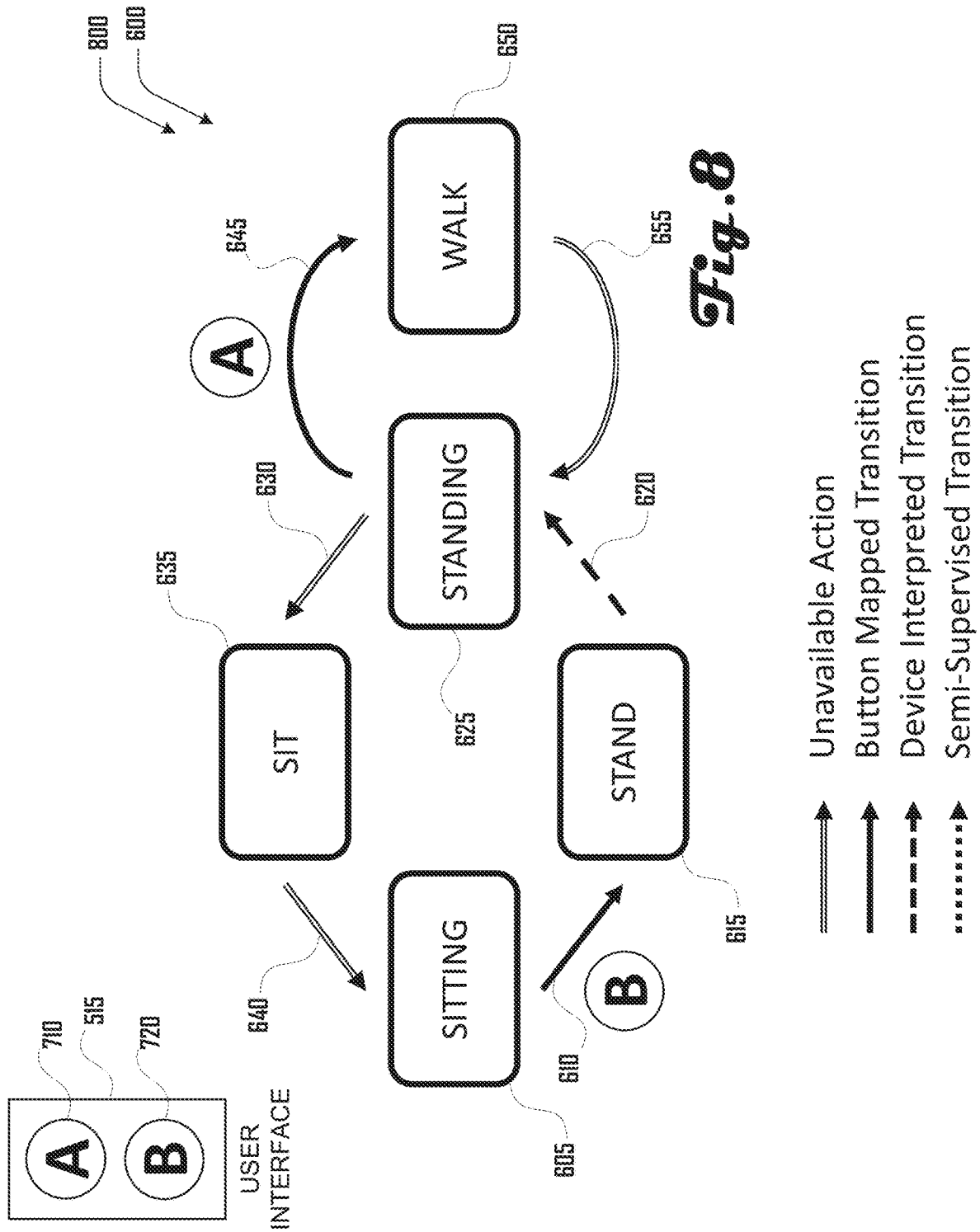
FIG. 8 is another example of a fully-supervised intent recognition method illustrated in the context of the state machine of FIG. 6 and a user interface having a first and second button.

Turning to FIG. 8, an example of a fully supervised intent recognition method 800 is illustrated in the context of the state machine 600 of FIG. 6 and a user interface 515 having a first and second button 710, 720. More specifically, expanding on the example of FIG. 7, to deal with multiple transitions in a fully supervised intent recognition system, Button A is mapped to a single transition 645 from standing state 625 to walk state 650 as discussed above. Additionally, the B-button 720 is shown mapped to a single transition (i.e., sitting-stand transition 610) from sitting state 605 to stand state 615.

As discussed herein, if the A-Button 710 is pressed and the user 101 is safe, the exoskeleton system 100 initiates a transition from standing 625 to walk 650. If the B-button 720 is pressed, the exoskeleton system 100 initiates a sitting-stand transition 610 from sitting 605 to stand 615, causing the user 101 to stand up from sitting. From there, the exoskeleton system can then interpret whether the user 101 has made it fully into the standing state 625 from the stand state 615 through the device interpreted stand-standing transition 620, and, if not, can abort the sitting-stand transition 610 as a safety measure and return the user to sitting. In other words, pressing the B-button 720 on the interface 515 can trigger the sitting-stand transition 610 from sitting 605 to a stand state 615, and the exoskeleton device 100 will then transition 620 to the standing state 625 unless an error occurs, in which case the device would return to the sitting state 605.

Accordingly, the A-Button 710 can only trigger the standing-walk transition 645 from the standing state 625 to the walking state 650 and the B-button 720 can only trigger the sitting-stand transition 610 from the sitting state 605 to the standing state 615, with all other transitions (i.e., 620, 630, 640, 655) being unavailable via a button press of the A-button 710 or B-button 720.

Figure 9:
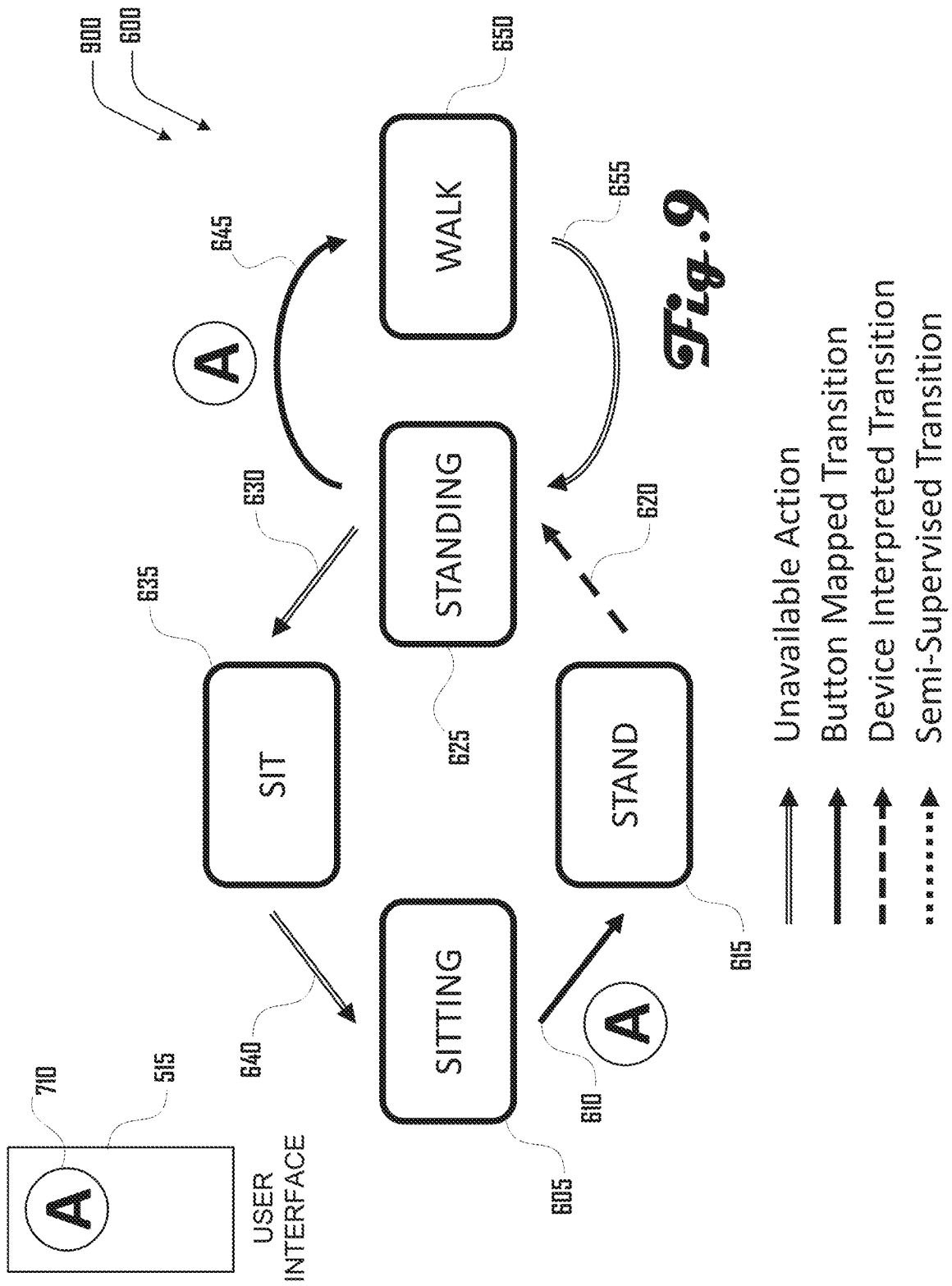
FIG. 9 is a further example of a fully-supervised intent recognition method illustrated in the context of the state machine of FIG. 6 and a user interface having a first button.

Turning to FIG. 9, another example of a fully supervised intent recognition method 900 is illustrated in the context of the state machine 600 of FIG. 6 and a user interface 515 (see FIG. 5) having an A-button 710. Specifically, FIG. 9 illustrates another variation of a fully-supervised state machine 900 where the A-Button 710 is mapped such that if the exoskeleton system 100 is in a standing state 625 and the user 101 is safe, pressing the A-Button 710 will cause the exoskeleton system 100 to initiate the standing-walk transition 645 to the walk state 650, and if the exoskeleton system 100 is in a sitting state 605 and the user 101 is safe, the exoskeleton system 100 will initiate the sitting-stand transition 610 to the stand state 615, after which the exoskeleton system 100 will then interpret whether there has been a successful transition 620 to the standing state 625 and behave accordingly. This example button configuration is similar to the previous example of FIG. 8 having dual buttons A and B 710, 720 except that the same button 710 is mapped to two specific transitions 610, 645 instead of one transition respectively. As such, in this example of a fully supervised intent recognition method, a single button press is mapped to one, and only one, transition, regardless of whether one, two, or a plurality of buttons is used to indicate that button press.

Figure 10:
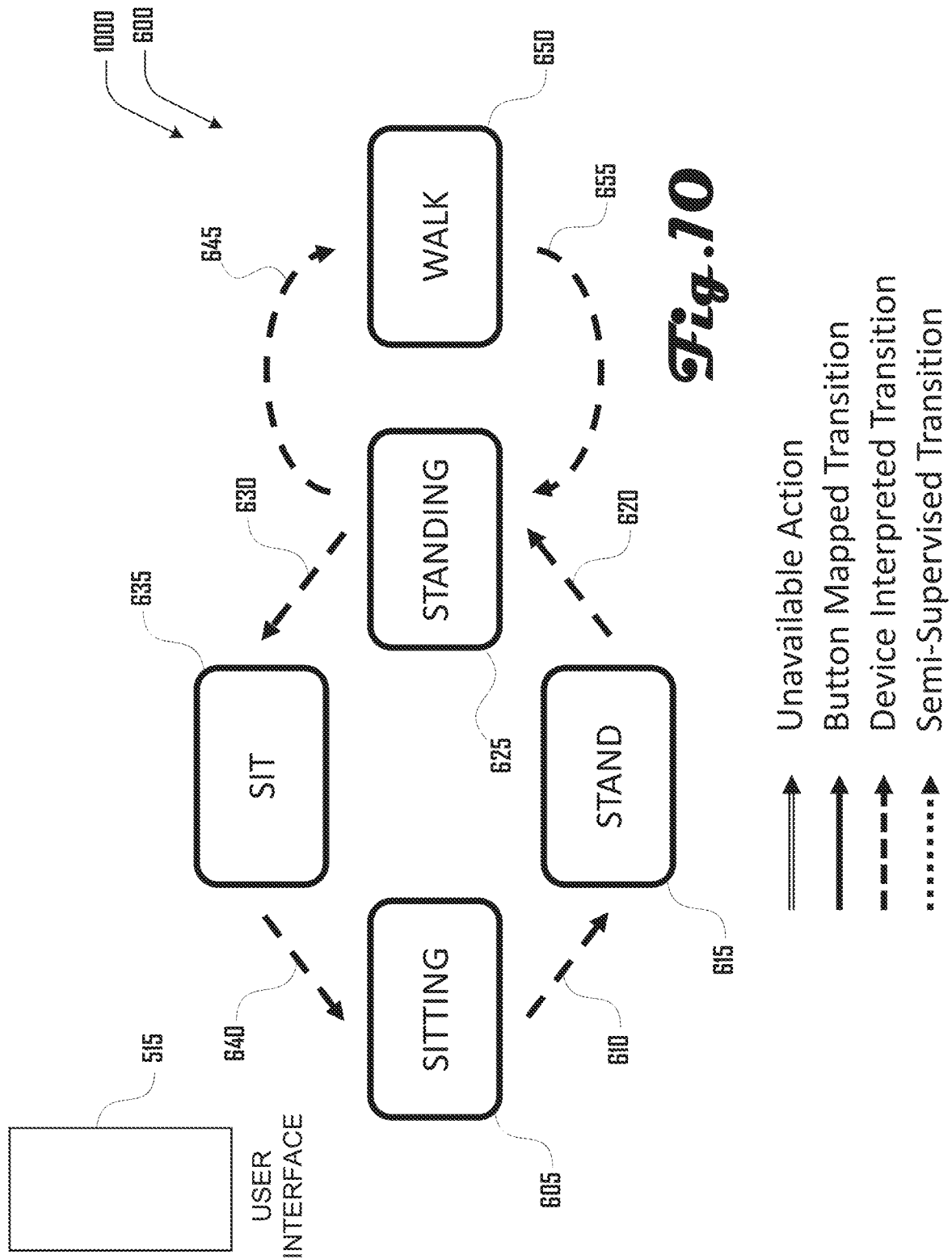
FIG. 10 illustrates an example of an unsupervised intent recognition method in accordance with one embodiment.

Fully-supervised intent recognition methods as discussed above can be distinguished from unsupervised intent recognition methods. For example, FIG. 10 illustrates an example of an un-supervised intent recognition method. More specifically, FIG. 10 illustrates an unsupervised state machine 1000 where the user 101 provides no direct manual input to the intent recognition of the exoskeleton system 100. Instead, the exoskeleton system 100 is continuously monitoring sensor inputs and interpreting what state the exoskeleton system 100 is currently in and what transition the user 101 is attempting to initiate. Once the threshold for a possible transition from the currently detected state is reached based on sensor data (e.g., from sensors 513) and the user 101 is interpreted as being in a safe configuration, the exoskeleton system 100 can then initiate the interpreted transition.

In contrast to the fully supervised intent recognition methods discussed in FIGS. 7-9, each of the transitions 610, 620, 630, 640, 645, 655 shown in FIG. 10 are device-interpreted transitions where the exoskeleton system 100 determines the current state (i.e., sitting 605, stand 615, standing 625, sit 635 and walk 650) and determines what transition, if any, the user is attempting to initiate. Accordingly, the example user interface 515 of FIG. 10 is without a button or other element or mechanism that allows the user 101 to initiate one or more specific transitions (although the user interface 515 can have other suitable functionalities). In other words, the unsupervised method of FIG. 10 does not allow the user 101 to provide input to indicate a desire to make a transition or to initiate a transition, whereas the supervised intent recognition methods discussed in FIGS. 7-9 do allow the user 101 to initiate a transition to some or all states through the user interface 515.

Figure 11:
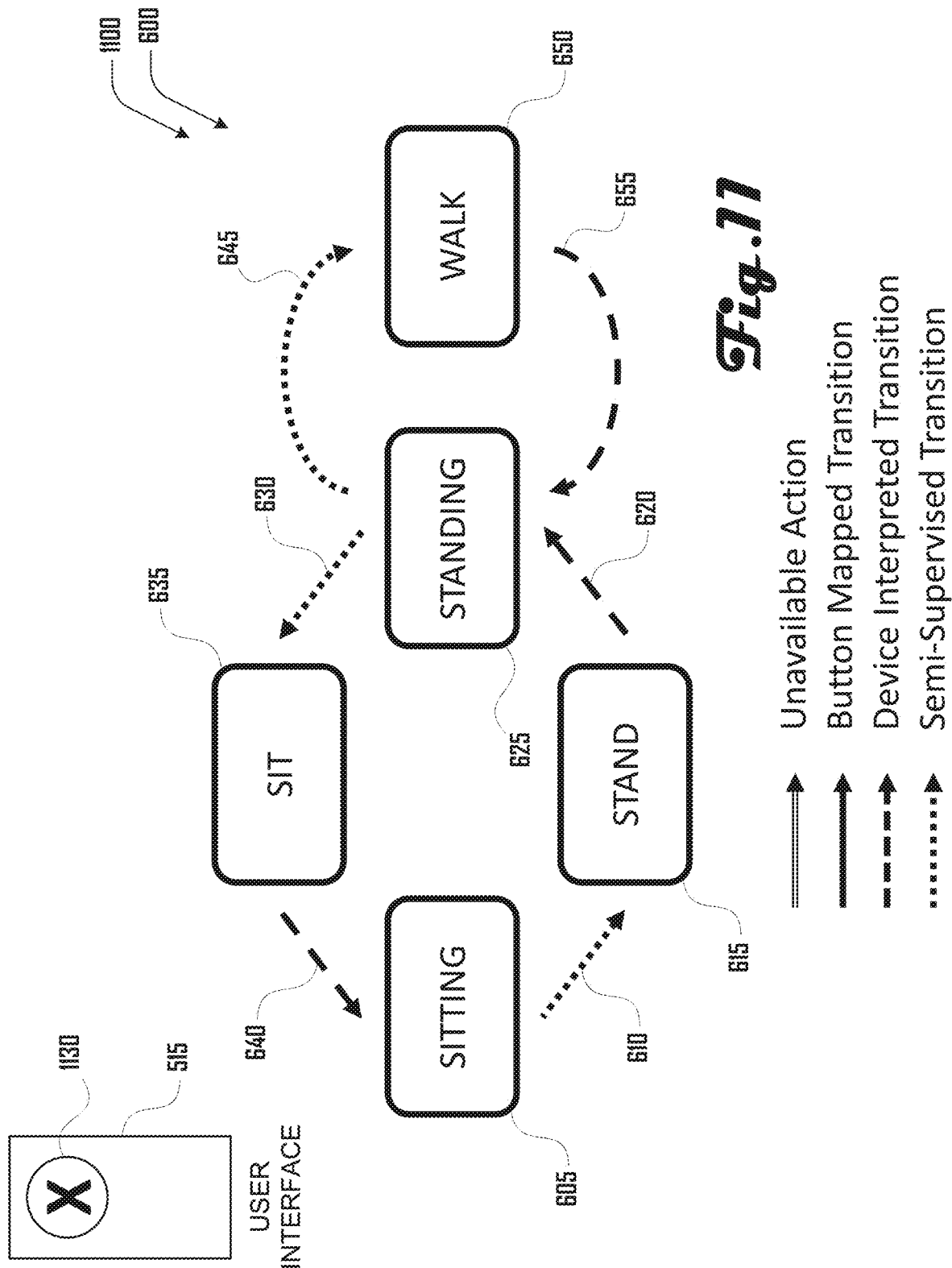
FIG. 11 illustrates an example embodiment of a semi-supervised intent recognition method.

As discussed herein, fully supervised intent recognition methods and unsupervised intent recognition methods can be distinguished from semi-supervised intent recognition methods as described in more detail below. For example, FIG. 11 illustrates an example embodiment of a semi-supervised intent recognition method. Specifically, FIG. 11 illustrates a semi-supervised state machine 1100 where user 101 provides direct manual input to the intent recognition of the exoskeleton system 100 indicating that the exoskeleton system 100 should look for a state transition from the current state, where the current state is known to or determined by the exoskeleton system 100 at the time of the manual input by the user 101.

Such an increased observance of a state transition can be accomplished in various suitable ways such as by lowering one or more thresholds for interpreting whether a transition is occurring, which can increase the chance that a transition is observed from the sensor inputs (e.g., from sensor data received from sensors 513).

After the manual input (e.g., the button X 1130 being pressed in this example), if a state transition is detected, the exoskeleton system 100 then proceeds to initiate the detected state transition. However, if no state transition is detected, the exoskeleton system 100 takes no action, and after a predefined timeout, the exoskeleton system 100 stops looking for transitions, returning the exoskeleton system 100 into a normal state of readiness for the next manual input.

In other words, in various embodiments, the exoskeleton system 100 can monitor and respond to the movements of a user 101 in a normal operation state including identifying and initiating various state transitions (e.g., any possible state transition as shown in the example of FIG. 11) with the identifying of the state transitions being associated with a first set of one or more thresholds, criteria, or the like. In response to an input from a user (e.g., pressing single button X 1130), the exoskeleton system 100 can still monitor and respond to the movements of the user 101, but according to a second set of one or more thresholds, criteria, or the like, such that identifying state transitions is made easier compared to normal operation under the first set.

More specifically, for some sets of sensor data, a given state transition would not be identified as being present when the exoskeleton system 100 is operating under the first set but would be identified as being present under the second set of one or more thresholds, criteria, or the like. Accordingly, in various embodiments, by the user 101 providing a given input (e.g., pressing single button X 1130), the exoskeleton system 100 can become more sensitive to identifying state transitions.

In various embodiments, sensitivity to state transitions initiated by the user 101 can be based on possible state transitions given the state that the user 101 and exoskeleton system 100 are currently in. Accordingly, in various embodiments, after an indication of an intention to make a state change is received (e.g., via the user 101 pushing the X-button 1130) a determination can be made as to what state the user 101 and exoskeleton system 100 are currently in and sensitivity to potential state changes by the user 101 can be tuned based on the determined current state.

For example, referring to FIG. 11, where a determination is made that the user is in the sitting state 605, sensitivity to identifying a transition to a stand state 615 can be tuned to be more sensitive, whereas other states that are not directly reachable from the sitting state (e.g., walk state 650 or sit state 635) can be excluded as potential states that may be detected or identified. Additionally, where multiple state transitions are possible from a given state, sensitivity can be tuned for these multiple potential state transitions. For example, referring to FIG. 11, where a determination is made that the user is in the standing state 625 sensitivity to identifying a transition to a sit or walk state 635, 650 can be tuned to be more sensitive, whereas other states that are not directly reachable from the sitting state (e.g., stand 615) can be excluded as potential states that may be detected or identified.

Having the exoskeleton system 100 become more sensitive to state transitions in response to an input from the user 101 can be desirable for improving the experience of the user wearing the exoskeleton system 100. For example, during normal operation, the threshold for identifying and responding to state transitions can be high to prevent false-positives of state transitions while also allowing the exoskeleton system 100 to respond if necessary where a state transition occurs.

However, where the user intends to initiate a state transition (e.g., moving from sitting to a standing position; moving from a standing position to a sitting position; moving from a standing position to walking; or the like), the user 101 can provide an input to indicate the intention to initiate a state transition and the exoskeleton system 100 can become more sensitive to state transitions in anticipation of the user 101 making the intended state transition. Such increased sensitivity can be desirable for preventing false negatives or failures to identify a state transition being initiated by the user 101.

Also, providing the user 101 with a single input to indicate an intention to make a state transition can be desirable because it makes operation of such an exoskeleton system 100 much simpler and user-friendly compared to fully supervised systems having multiple buttons mapped to different specific state transitions or systems where a single button is mapped to fewer than all state transitions (e.g., as shown in FIGS. 7-9). Providing the user 101 with a single input to indicate an intention to make a state transition can be desirable over unsupervised methods because providing the user 101 with the ability to indicate an intention to make state transitions helps to prevent false positives and false negatives for state transitions by providing variable sensitivity to state transitions based on user intent or desire to make state transitions, which can be associated with an increased likelihood of a state transition occurring.

To further illustrate the difference between the fully supervised intent recognition methods of FIGS. 7-9 and semi-supervised method of FIG. 11, it can be useful to focus on examples where a user has multiple options for making a state transition from a given state. For example, as shown in the state diagram 1100 of FIG. 11, a user in a standing state 625 has the option of transitioning to a sitting state 605 via a sit maneuver state 635 or the option of transitioning to a walk state 650. As shown in the example of FIG. 11, where a user 101 presses the button 1130, the user 101 has the option initiating a standing-sit transition 630 or a standing walk-transition 645, and the exoskeleton system 100 can be become more sensitive to both potential transitions 630, 645 and can respond to the user 101 initiating either potential transition 630, 645.

In contrast, as shown in the examples of FIGS. 7-9, where the A-button 710 is pressed, the user 101 will be forced into the standing-walk transition 645 or at the very least will not have the option of a standing-sit transition 630, with the standing-sit transition 630 being an unavailable action. Accordingly, while fully-supervised methods can limit the options of the movements of the user 101, semi-supervised methods (e.g., as shown in FIG. 11) can allow for a user to indicate an intent to make a state transition without explicitly or implicitly specifying one or more specific state transitions. Stated another way, fully-supervised methods can limit the options of the movements of the user 101, whereas semi-supervised methods of various embodiments do not limit the options of the movements of the user 101 and allows the exoskeleton system 100 to adapt to the movements of the user 101 without limitation.

The difference between fully supervised intent recognition and semi-supervised intent recognition can also be illustrated when examining a state machine where one state has a larger number of possible state transitions. For example, FIG. 12 illustrates an example state machine 1200 in a fully supervised intent recognition method 1201 where a standing state 625 has eight possible transitions 630, 645, 1205, 1215, 1225, 1235, 1245, 1255 to eight different system states 635, 650, 1210, 1220, 1230, 1240, 1250, 1260.

More specifically, a user 101 of an exoskeleton system 100 has the option of transitioning from a standing state 625 to a sit state 635 via a standing-sit transition 630; to a walk state 650 via a standing-walk transition 645; to a jump state 1210 via a standing-jump transition 1205; to a lunge state 1220 via a standing-lunge transition 1215; to a crouch state 1230 via a standing-crouch transition 1225; to a dive state 1240 via a standing-dive transition 1235; to a sprint state 1250 via a standing-sprint transition 1245; and to a jog state 1260 via a standing-jog transition 1255.

Figure 12:
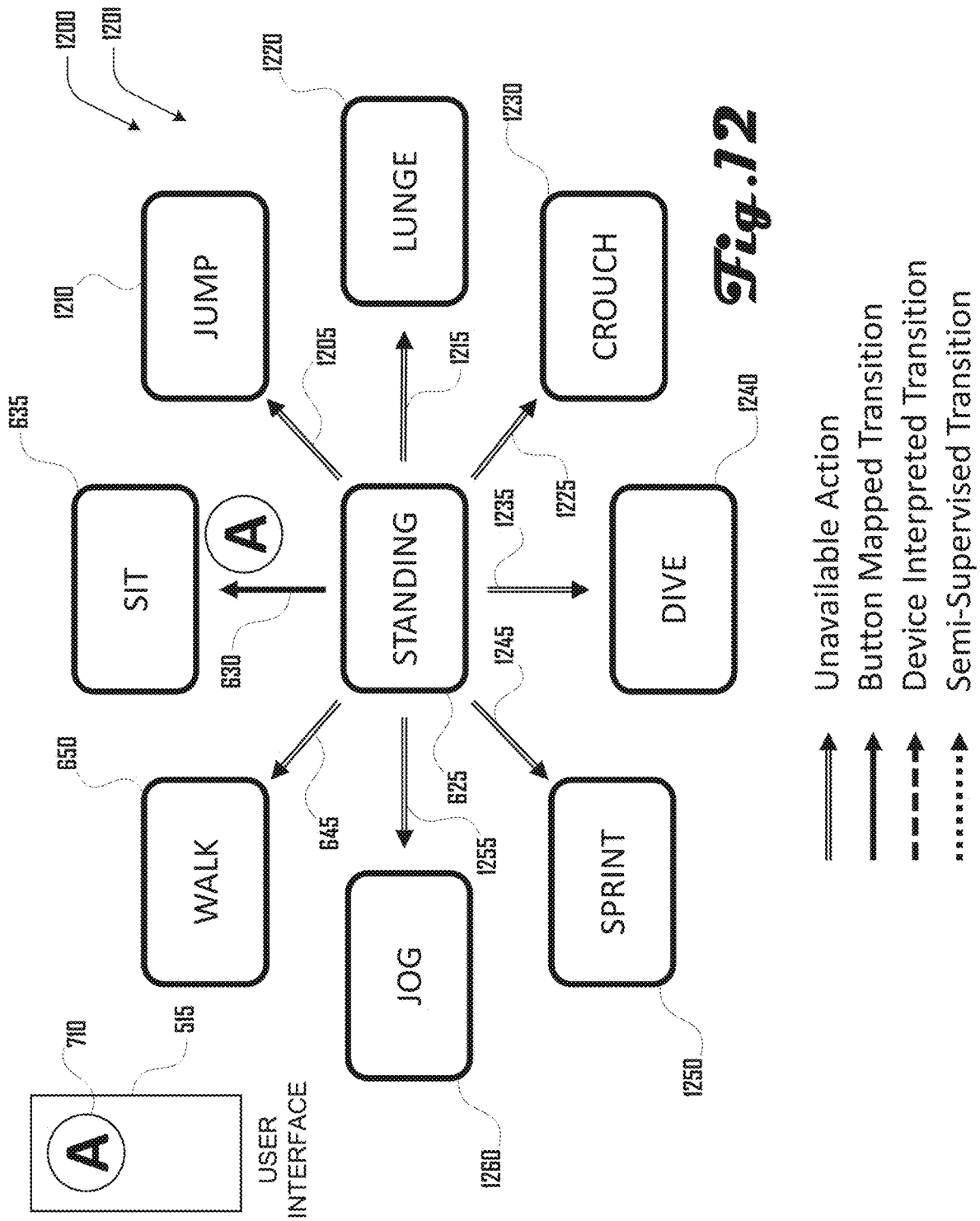
FIG. 12 illustrates an example state machine in a supervised intent recognition method where a standing state has eight possible transitions to eight respective states and a button mapped to a single transition and state pair.

As shown in the example of FIG. 12, a user interface 515 can have an A-button 710 that is mapped to the standing-sit transition 630. When the A-button 710 is pressed in this example, the exoskeleton system 100 can initiate transitioning to the sit state 635 via the standing-sit transition 630, with the other states and transitions being unavailable when the A-button is pushed.

Figure 13:
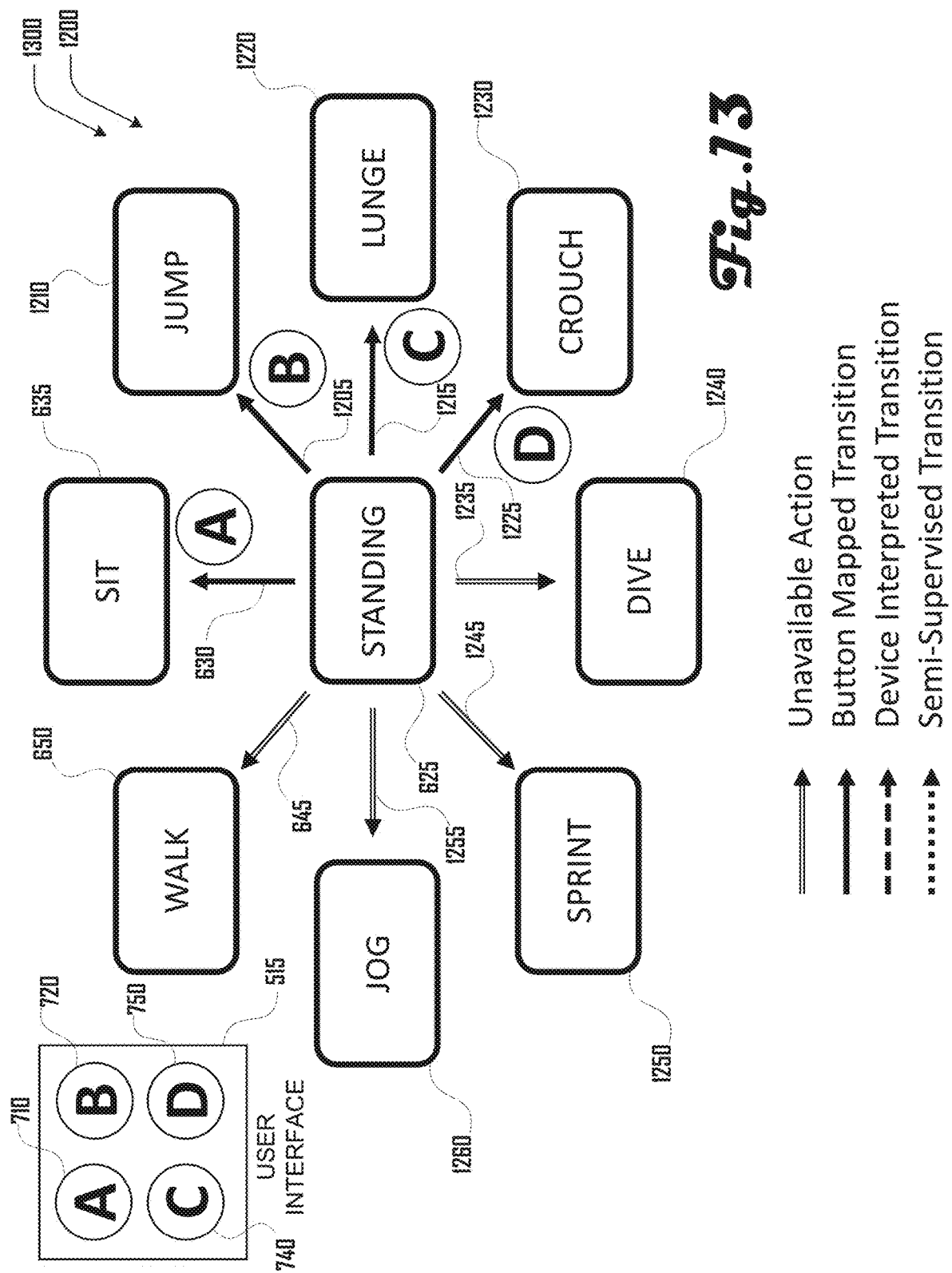
FIG. 13 illustrates an example state machine in a supervised intent recognition method where a standing state has eight possible transitions to eight respective states and four buttons are respectively mapped to single transition and state pairs.

In a similar example, FIG. 13 illustrates a state machine 1200 in a supervised intent recognition method 1300 where a standing state 625 has eight possible transitions to eight respective states and four buttons 710, 720, 740, 750 are respectively mapped to single transition and state pairs. More specifically, the A-button 710 is mapped to the standing-sit transition 630; the B-button 720 is mapped the standing-jump transition 1205; the C-button 740 is mapped to the standing-lunge transition 1215; and the D-button 750 is mapped to the standing-crouch transition 1225.

Similar to the example of FIG. 12, the method 1300 of FIG. 13 illustrates that each of the buttons 710, 720, 740, 750, when pressed, triggers a transition to the state that the given button is mapped while making the other transitions and states unavailable. In this example, other state transitions are only available when pressing their respective associated buttons from the original state. Although the example of FIG. 13 illustrates only four buttons mapped to four respective state and transition pairs, in further embodiments, each of the states can be mapped to a respective button. In other words, for the example state machine 1200 of FIGS. 12 and 13 in further embodiments each of the eight state-transition pairs can be mapped to a respective button. Accordingly, where a user 101 wants to transition from the standing state 625 to another state, the user 101 must press a specific button associated with the given state or state transition to initiate the transition to the desired state.

Figure 14:
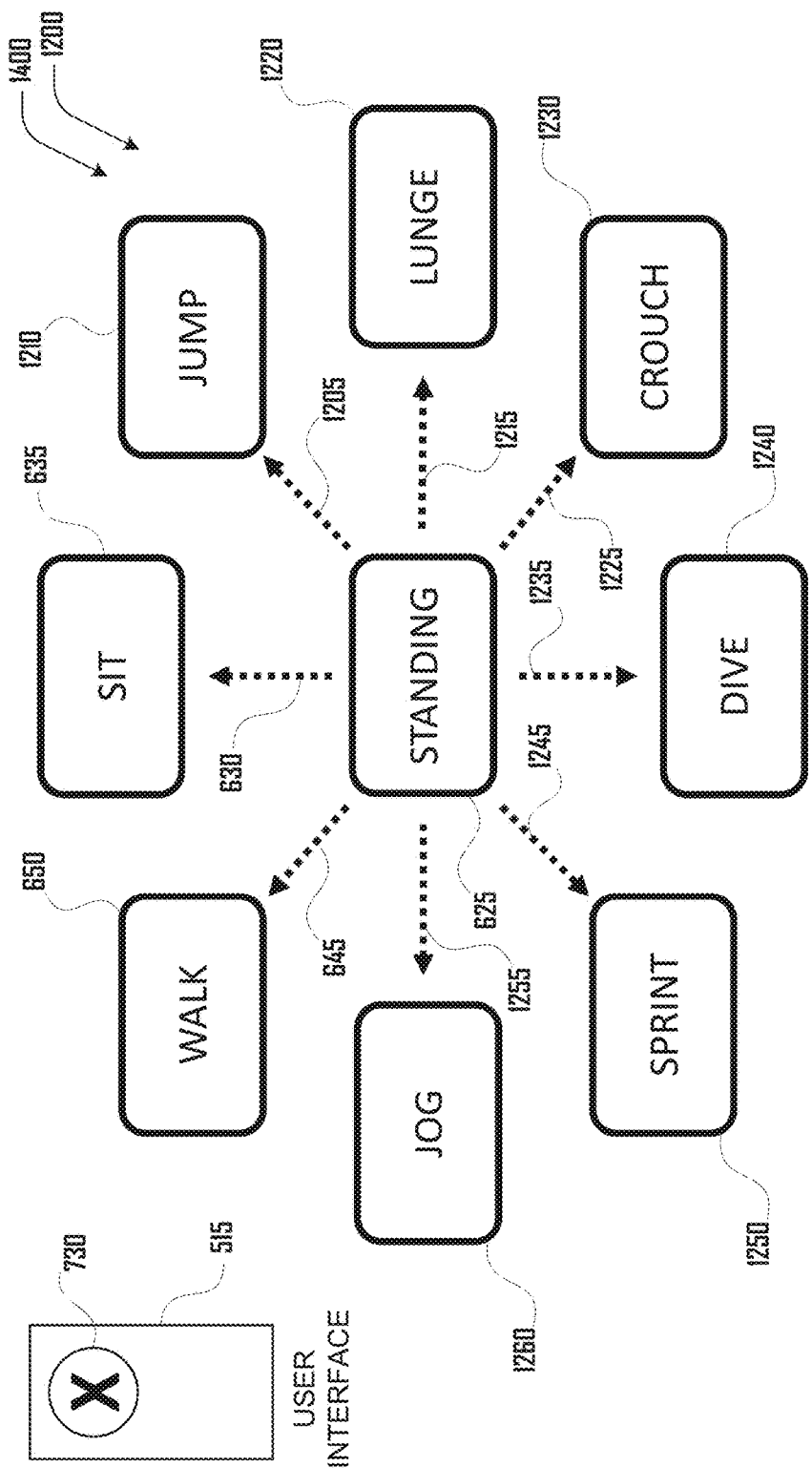
FIG. 14 illustrates an example of a semi-supervised intent recognition method having the state machine as shown in FIGS. 12 and 13 and a user interface having a single button for indicating an intention to make a state transition.

In contrast, FIG. 14 illustrates an example of a semi-supervised intent recognition method 1400 having the state machine 1200 as shown in FIGS. 12 and 13 and a user interface 515 having a single button 730 for indicating an intention to make a state transition. As shown in FIG. 14, the user 101 can be in a standing state 625 and can press the X-button 730 to indicate the intention or desire to make a state transition, and the exoskeleton system 100 can become more sensitive to identifying state transitions, allowing the exoskeleton system 100 to initiate any of the eight possible state transitions shown in the example of FIG. 14 based on whether a state transition is detected from the user's behavior, or, alternatively, choose to not initiate a state transition if none is detected.

In other words, in the semi-supervised intent recognition method 1400 of FIG. 14, because the manual input (X-button 730) only indicates for the exoskeleton system 100 to become more sensitive to detecting any possible transition (e.g., by lowering the transition thresholds to possible behaviors) from the current state, all possible state transitions remain possible.

Also, no transition is also possible and the user 101 is not forced or required to make a state transition. However, in the fully supervised example of FIG. 13, if the B-button 720 is pressed and the current standing configuration state 625 is deemed safe to the user 101 to transition, the exoskeleton system 100 will initiate a standing to jump transition 1205. Whereas in the example of FIG. 14, if X-button 730 is pressed and the user 101 is doing nothing that indicates a transition should occur, is about to occur, or is occurring, no transition will occur.

Additionally, while various embodiments of semi-supervised intent recognition methods are discussed having a single button (e.g., the X-button 730), it should be clear that various embodiments can comprise a single input type, with one or more input methods for the single input type. For example, in some embodiments, an exoskeleton system 100 can comprise a first and second X-button 730 disposed respectively on the left and right actuator units 110A, 110B of the exoskeleton system 100, and the user 101 can press either of the buttons 730 to make the exoskeleton system 100 more sensitive or responsive to identifying state transitions. Also, the single input type can be associated with multiple input methods in some embodiments. For example, a user 101 can press an X-button 730, can knock on the body of the exoskeleton system 100 or provide a voice command to make the exoskeleton system 100 more sensitive or responsive to identifying state transitions.

One way to mathematically describe the difference between a fully supervised method and a semi-supervised method is to examine the probability of possible state transitions from a given starting state. In fully supervised methods for various state machines (e.g., state machine 600 of FIG. 6), the probability of transitioning from standing 625 to walk 650 can be equal to N (i.e., P(Walk/Standing)=N). The probability of transitioning from standing 625 to standing 625 is then 1-N (i.e., P(Standing/Standing)=1-N), in which case the exoskeleton system 100, (e.g., due to a safety feature), did not allow the standing-walk transition to occur. The probability of transitioning from standing 625 to sit 635 equals 0 (i.e., P(Sit/Standing)=0), because in various fully supervised methods, a manual input can only map a single desired transition from a single starting state.

In a semi-supervised method for such same state machines (e.g., state machine 600 of FIG. 6), the probability of transitioning from standing 625 to walk 650 can be equal to A (i.e., P(Walk/Standing)=A). The probability of transitioning from standing 625 to standing 625 is B (i.e., P(Standing/Standing)=B). The probability of transitioning from standing 625 to sit 635 is 1-A-B (i.e., P(Sit/Standing)=1-A-B). This can be because in some embodiments of a semi-supervised intent recognition method, the exoskeleton system 100 is left to interpret the desired state transition from the given starting state, allowing the exoskeleton system 100 to decide between sit 635, walk 650, or remaining standing 625.

Figure 15:
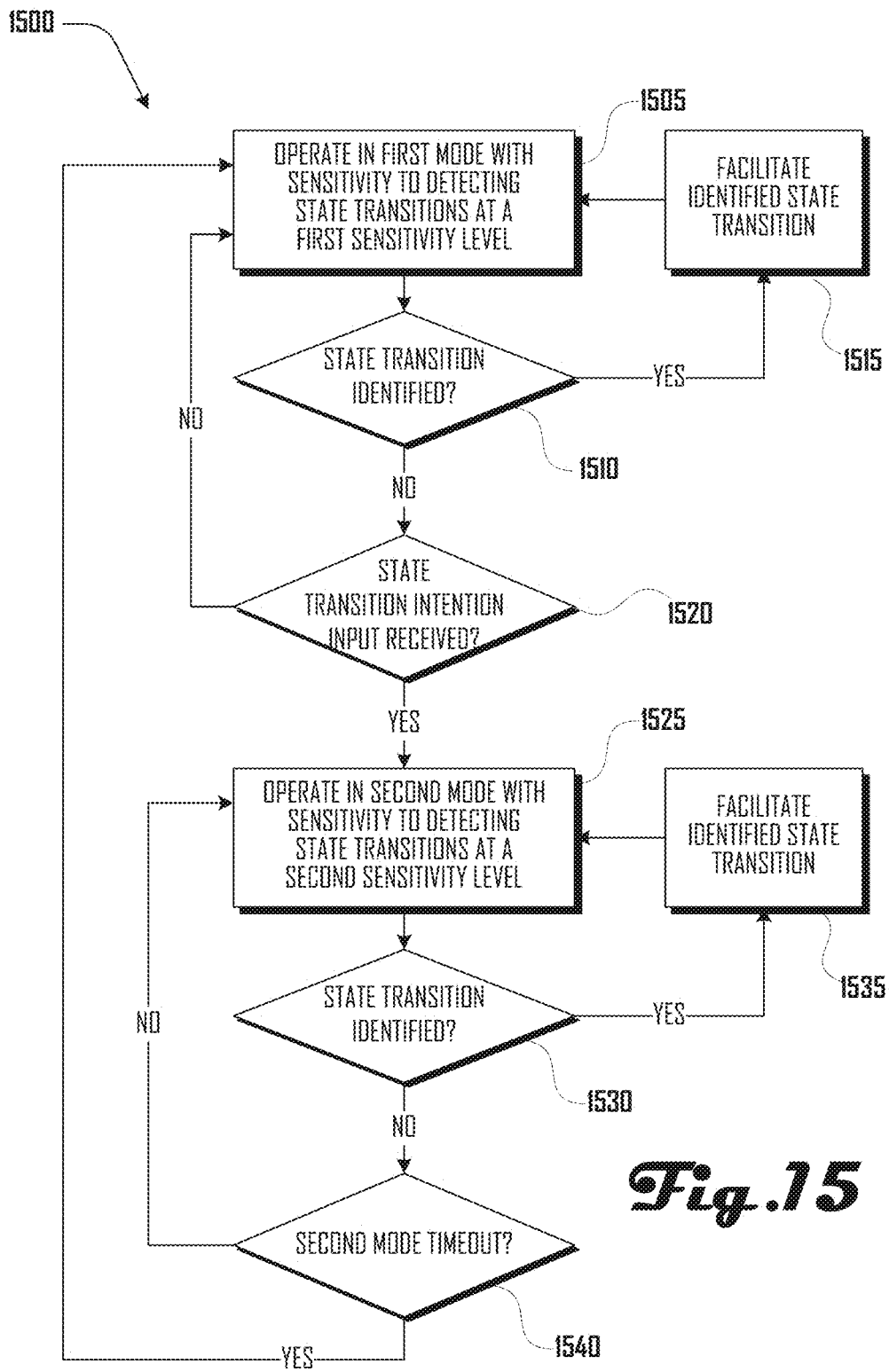
FIG. 15 is a block diagram of a semi-supervised intent recognition method in accordance with one embodiment.

Turning to FIG. 15, a semi-supervised intent recognition method 1500 in accordance with one embodiment is illustrated, which in various examples can be implemented by an exoskeleton device 510 of an exoskeleton system 100 (see FIG. 5). The method 1500 begins at 1505 where the exoskeleton system 100 operates in a first mode with sensitivity to detecting state transitions at a first sensitivity level. At 1510, a determination is made whether a state transition is identified, and if so, the exoskeleton device facilitates the identified state transition at 1515 and the method 1500 cycles back to 1505 where the exoskeleton system 100 operates in the first mode with sensitivity to detecting state transitions at the first sensitivity level. However, if at 1510 a state transition is not identified, then at 1520 a determination is made whether a state transition intention input is received, and if not, the method 1500 cycles back to 1505 where the exoskeleton system 100 operates in the first mode with sensitivity to detecting state transitions at the first sensitivity level.

For example, the exoskeleton 100 can operate in a normal sensitivity mode (e.g., the first mode) and can identify one or more state transitions being initiated or made by the user 101 and can act accordingly to support the user with such identified one or more state transitions as necessary. Also, the exoskeleton system 100 can monitor or wait for a state transition intention input to be received, which as discussed herein can be received in various suitable ways such as via pressing a button on a user interface 515, via haptic input, via audio input, or the like.

In various embodiments, the exoskeleton system 100 can operate and transition the user 101 through some or all available states during a given operating session without a state transition intention input ever being received. For example, exoskeleton system 100 can be powered up, operate in various position states and then be powered off without a state transition intention input being received. In other words, in various embodiments, the exoskeleton system 100 can be fully functional and have the ability to move through all available position states and transitions without a state transition intention input ever being received.

Returning to the method 1500, if a state transition intention input is received at 1520, then the method 1500 continues to 1525 where the exoskeleton system 100 operates in a second mode with sensitivity to detecting state transitions at a second sensitivity level. At 1530, a determination is made whether a state transition is identified, and if so, at 1535 the exoskeleton system 100 facilities the identified state transition and the method 1500 cycles back to 1525 where the exoskeleton system 100 operates in the second mode with sensitivity to detecting state transitions at a second sensitivity level.

However, if a state transition is not identified at 1530, the method 1500 continues to 1540 where a determination is made whether a second mode timeout has occurred. If not, the method 1500 cycles back to 1525 where the exoskeleton system 100 operates in the second mode with sensitivity to detecting state transitions at a second sensitivity level. However, if a second mode timeout is determined, then the method 1500 cycles back to 1505 where the exoskeleton system 100 operates in the first mode with sensitivity to detecting state transitions at the first sensitivity level.

For example, where a state transition intention input is received by the exoskeleton system 100, the exoskeleton system 100 can switch from detecting state transitions at the first sensitivity level in the first mode to detecting state transitions at the second sensitivity level in the second mode, with the first and second sensitivity levels being different. The exoskeleton system 100 can monitor for state transitions and can facilitate one or more state transitions that are identified until a timeout for operating in the second mode occurs. However, it is not necessary that state transitions are ever identified and/or facilitated while operating in the second mode before a timeout of the second mode occurs.

As discussed herein, in various examples, the second sensitivity level of the second mode can be more sensitive to detecting or identifying state transitions compared to the first sensitivity level of the first mode. The greater sensitivity of the of the second sensitivity level can be achieved in various suitable ways including lowering one or more thresholds associated with identifying one or more state transitions; removing or modifying criteria for identifying one or more state transitions; or the like. However, in various embodiments, a subset of thresholds and/or criteria of a set of criteria need not be changed, removed or modified. Also, in some embodiments, one or more thresholds can be increased if the overall effect of the difference between the second sensitivity level from the first sensitivity level results in greater overall sensitivity of the second sensitivity level. In further embodiments, the first and second mode can be different in any suitable way such that for some sets of sensor data, a given state transition would not be identified as being present when the exoskeleton system 100 is operating in the first mode, but would be identified as being present when the exoskeleton system 100 is operating in the second mode.

A second mode timeout can be generated or implemented in various suitable ways. In some embodiments, a second mode timeout can comprise a timer corresponding to the time that a given second mode session has been active (e.g., an amount of time from when a switch from the first mode to the second mode occurs), and the second mode timeout can occur when the timer reaches or exceeds a defined timeout threshold. For example, a timeout threshold can be a number of seconds, minutes, or the like, including 1 second, 5 seconds, 10 seconds, 20 seconds, 30 seconds, 45 seconds, 60 seconds, 90 seconds, 2 minutes, 3 minutes, 5 minutes, or the like.

Such a timeout threshold can be static or variable. In some embodiments, second mode sessions can last a defined amount of time. In further embodiments, second mode sessions can last a defined amount of time by default but can be extended or shortened based on any suitable criteria, conditions, sensor data, or the like. For example, in some embodiments, a second mode session can end after a state transition is identified and/or the identified state transition is facilitated.

Intent recognition methods can be used in various suitable applications. One example embodiment includes an intent recognition method for a lower extremity exoskeleton system 100 for assisting with community mobility of aging adults. The exoskeleton system 100 can be designed to assist with transitions between seated and standing positions, ascending and descending stairs, as well as providing assistance during walking maneuvers. In this example, the user is provided with a single input to the exoskeleton system 100 in the form of knocking or tapping twice on the exterior of the exoskeleton system 100. This manual interaction by the user 101 can be sensed through monitoring integrated accelerometers or other sensors 513 of the exoskeleton system 100. The exoskeleton system 100 can interpret the input from the user 101 as an indication that a change in behavior is coming. The exoskeleton system 100 can utilize unsupervised intent recognition methods that monitor the device sensors 513 to observe a change in the user's behavior to identify intent; however, the specific methods can be tuned to be very conservative so as to avoid false indications of intent. When the intent is indicated from the user 101, the required confidence threshold for the method can lower, allowing the exoskeleton system 100 to be much more sensitive and willing to respond to what it interprets as a triggered motion.

In such an example, the subject may have donned the exoskeleton system 100 from a seated position and the only available state transition to the device is to then stand up. When the user 101 taps the exoskeleton system 100 twice, the exoskeleton system 100 can relax the threshold requirements for the stand behavior for a fixed period of time, which for the purpose of this example can be set at 5 seconds. If the user 101 does not seek to initiate a stand behavior the intent indication will simply time out and return the conservative thresholds. If the user 101 does attempt to initiate a stand behavior, the exoskeleton system 100 will see the motion and respond with assistance accordingly. Once in a standing position, the user 101 can make a variety of actions including walking, transition to sit, ascend stairs or descend stairs. In this case, the user 101 can decide to not tap the machine and begin walking. At this point, the device can still respond to the behavior, but it may require a much more confident identification of the targeted behavior.

After stopping walking, the user 101 intends to ascend stairs. The user 101 taps the device twice to indicate the coming change in intended behavior and then begins to complete the motion. Here, the user's indicated intent does not specify for the exoskeleton system 100 what behavior the user 101 intends to transition to, only that a transition will likely occur in the near future. The exoskeleton system 100 observes the user 101 is standing, and using a more sensitive transition threshold the exoskeleton system 100 allows for the transition in behavior modes to occur.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A robotic system configured to execute a semi-supervised intent recognition control program, the robotic system comprising a leg actuator unit that includes:
    a processor;
    a user interface comprising a single button;
    a joint configured to be aligned with a knee of a leg of a user wearing the leg actuator unit;
    an upper arm coupled to the joint and extending along a length of an upper leg portion above the knee of the user wearing the leg actuator unit;
    a lower arm coupled to the joint and extending along a length of a lower leg portion below the knee of the user wearing the leg actuator unit; and
    an actuator configured to actuate the upper arm and lower arm and move the leg actuator unit into a plurality of different position states, and
    where executing the semi-supervised intent recognition control program causes the robotic system to:
        receive a state transition intention input via the single button for indicating, via only pressing the single button, an intention to make a state transition without indicating, via pressing the single button, a specific state transition of a plurality of possible state transitions to be made, and pressing the single button only indicating a user intention to make a state transition from a first state to a second state, with the second state being identifiable by the robotic system from a plurality of possible different states, only the single button is useable to generate the state transition intention input, and
        in response to the state transition intention input, the processor is configured to change the robotic system from operating in a first mode with sensitivity to detecting state transitions at a first sensitivity level to temporarily operating in a second mode with sensitivity to detecting state transitions while operating in the second mode at a second sensitivity level that is more sensitive than the first sensitivity level;
        identify a state transition of the plurality of possible state transitions to be made while operating in the second mode and using the second sensitivity level, and in response, facilitate the identified state transition by actuating the robotic system; and
        automatically switch back to the first mode from the second mode without input from the single button.

2. The robotic system of claim 1, wherein the first state is a standing state and wherein the plurality of possible different states comprise:
    a sitting state; and
    a walking state.

3. The robotic system of claim 1, wherein the plurality of possible state transitions to be made comprise:
    a standing state to a sitting state; and
    a standing state to a walking state.

4. The robotic system of claim 1, wherein identifying the state transition at the second sensitivity level is based at least in part on a set of sensor data obtained from one or more sensors of the robotic system, and wherein the set of sensor data identifies the state transition at the second sensitivity level, but would not identify the state transition at the first sensitivity level of the first mode.

5. The robotic system of claim 1, wherein identifying the state transition while operating in the second mode and using the second sensitivity level comprises:
    determining that the robotic system is in a standing state, with the robotic system having an option to transition to either of a sit state or walk state from the standing state while operating in the second mode and after receiving the state transition intention input;
    monitoring for state transitions including for a state transition to either of the sit state or walk state; and
    identifying the state transition using the second sensitivity level, the state transition being to one of the sit state or walk state, and in response, facilitating the transition to the one of the sit state or walk state by actuating the robotic system.

6. The robotic system of claim 1, wherein receiving a state transition intention input does not trigger a state transition by the robotic system, and wherein receiving a state transition intention input does not limit state transition options of the robotic system.

7. A robotic system that comprises a semi-supervised intent recognition control program, a processor, and a user interface comprising a single button, the robotic system configured to execute the semi-supervised intent recognition control program, where executing the semi-supervised intent recognition control program causes the robotic system to:
    in response to a state transition intention input, the processor of the robotic system is configured to change the robotic system from operating in a first mode with sensitivity to detecting state transitions at a first sensitivity level to operating temporarily in a second mode with sensitivity to detecting state transitions at a second sensitivity level that is more sensitive than the first sensitivity level, wherein the state transition intention input is generated via the single button for indicating an intention to make a state transition without indicating a specific state transitions of a plurality of possible state transition to be made, wherein the single button is the only portion of the user interface that is useable to generate the state transition intention input,
    identify a state transition of the plurality of possible state transitions to be made while operating in the second mode and using the second sensitivity level;
    facilitate the identified state transition by actuating the robotic system; and
    automatically switch back to the first mode from the second mode without input from the single button.

8. The robotic system of claim 7, wherein the state transition intention input only indicates an intention to make a state transition from a first state to a second state, with the second state being selectable from a plurality of possible different states.

9. The robotic system of claim 8, wherein the first state is a standing state and wherein the plurality of possible different states comprise:
   a sitting state; and
   a walking state.

10. The robotic system of claim 7, wherein the plurality of possible state transitions to be made comprise:
    a standing state to a sitting state; and
    a standing state to a walking state.

11. A robotic system comprising:
    a user interface comprising a single button and a processor, in response to a single state transition intention input from the single button, the processor is configured change the robotic system from operating in a first mode with sensitivity to detecting state transitions at a first sensitivity level to operating temporarily in a second mode with sensitivity to detecting state transitions at a second sensitivity level that is more sensitive than the first sensitivity level,
    wherein the state transition intention input indicates an intention to make a state transition from a first state to a second state without indicating a specific state transition of a plurality of possible state transitions to be made, with the second state being possible from a plurality of possible different states, the single button is the only portion of the interface element that is configured to generate the state transition intention input, the processor configured to identify a state transition of the plurality of possible state transitions to be made while operating in the second mode and using the second sensitivity level; and facilitate the identified state transition by actuating the robotic system and automatically switch back to the first mode from the second mode without input from the single button.

12. The robotic system of claim 11, wherein the plurality of possible state transitions to be made comprise:
    a standing state to a sitting state; and
    a standing state to a walking state.

13. The robotic system of claim 11, wherein the first state is a standing state and wherein the plurality of possible different states comprise:
    a sitting state; and
    a walking state.

14. The robotic system of claim 11, wherein identifying the state transition at the second sensitivity level is based at least in part on sensor data that identifies the state transition at the second sensitivity level, but would not identify the state transition at the first sensitivity level of the first mode.

15. The robotic system of claim 11, wherein identifying the state transition while operating in the second mode and using the second sensitivity level comprises:
    determining that the robotic system is in a first physical state, with the robotic system having an option to transition to a plurality of physical states from the first physical state while operating in the second mode and after receiving the state transition intention input; and
    identifying the state transition using the second sensitivity level, the state transition being to one of the plurality of physical states, and in response, facilitating the transition to the one of the plurality of physical states by actuating the robotic system.

* * * * *